(12) United States Patent
Murakawa et al.

(10) Patent No.: US 11,256,466 B2
(45) Date of Patent: Feb. 22, 2022

(54) INFORMATION PROCESSING APPARATUS, INFORMATION PROCESSING METHOD, AND RECORDING MEDIUM RECORDING INFORMATION PROCESSING PROGRAM

(71) Applicant: FUJITSU LIMITED, Kawasaki (JP)

(72) Inventors: Yoshihiko Murakawa, Yokohama (JP); Keiju Okabayashi, Sagamihara (JP); Masashi Uyama, Kako (JP); Hideki Tanaka, Kawasaki (JP); Kenji Nakajima, Machida (JP); Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/709,324

(22) Filed: Dec. 10, 2019

(65) Prior Publication Data

US 2020/0117414 A1 Apr. 16, 2020

Related U.S. Application Data

(63) Continuation of application No. PCT/JP2017/024856, filed on Jul. 6, 2017.

(51) Int. Cl.
*G09G 5/373* (2006.01)
*G06F 3/01* (2006.01)
(Continued)

(52) U.S. Cl.
CPC ............ *G06F 3/1454* (2013.01); *G06F 3/011* (2013.01); *G06T 7/70* (2017.01); *G09G 5/373* (2013.01);
(Continued)

(58) Field of Classification Search
CPC ...... G06F 3/1454; G06F 3/011; G06F 3/0481; G09G 2354/00
See application file for complete search history.

(56) References Cited

U.S. PATENT DOCUMENTS

2012/0233553 A1\* 9/2012 Barrus ................ G09B 5/12
715/751
2014/0098138 A1\* 4/2014 Dogra ................ G09B 5/00
345/633
(Continued)

FOREIGN PATENT DOCUMENTS

EP 2498237 A2 9/2012
JP 2005-117285 A 4/2005
(Continued)

OTHER PUBLICATIONS

M. Apperley et al., "Use of Video Shadow for Small Group Interaction Awareness on a Large Interactive Display Surface", Proceedings of Australasian User Interface Conference (AUIC2003), Adelaide, Australia, pp. 81-90 (10 pages), Feb. 4, 2003. Cited in Extended European Search Report (EESR) dated May 27, 2020 for corresponding European Patent Application No. 17917078.2.
(Continued)

*Primary Examiner* — Md Saiful A Siddiqui
(74) *Attorney, Agent, or Firm* — Fujitsu Patent Center

(57) ABSTRACT

An information processing apparatus includes: a memory; and a processor coupled to the memory and configured to: determine, when a first apparatus displays a part of contents, whether or not a user who operates a second apparatus which is different from the first apparatus is at a position where it is possible to operate the part of the contents among the contents displayed on the first apparatus; and cause the first apparatus to display an image indicating that the user is present at the position where it is possible to operate the part of the contents based on a determination result.

9 Claims, 19 Drawing Sheets

(51) Int. Cl.
*G06T 7/70* (2017.01)
*G06F 3/14* (2006.01)
*G09G 5/38* (2006.01)

(52) U.S. Cl.
CPC ...... *G09G 5/38* (2013.01); *G06T 2207/30196* (2013.01); *G09G 2354/00* (2013.01)

(56) References Cited

U.S. PATENT DOCUMENTS

| | | | |
|---|---|---|---|
| 2014/0164967 A1 | 6/2014 | Takamura et al. | |
| 2016/0127775 A1* | 5/2016 | Zilberstein | G06Q 30/0251 |
| | | | 725/34 |
| 2016/0142471 A1* | 5/2016 | Tse | H04L 65/403 |
| | | | 715/753 |
| 2016/0373693 A1* | 12/2016 | Segal | H04N 21/47 |
| 2018/0004475 A1 | 1/2018 | Itakura et al. | |

FOREIGN PATENT DOCUMENTS

| | | |
|---|---|---|
| JP | 2012-185823 A | 9/2012 |
| JP | 2014-115711 A | 6/2014 |
| JP | 2015-109565 A | 6/2015 |
| JP | 2017-27335 A | 2/2017 |
| WO | WO 0025199 A1 * | 11/2000 |
| WO | 2009/112967 A1 | 9/2009 |
| WO | 2016/147373 A1 | 9/2016 |

OTHER PUBLICATIONS

EESR—Extended European Search Report of European Patent Application No. 17917078.2 dated May 27, 2020.

Higuch, Keita et al., "ImmerseBoard: Immersive Telepresence Experience using a Digital Whiteboard", Proceedings of the ACM SIGCHI Conference on Human Factors in Computing Systems (CHI), pp. 2383-2392, 2015.

International Search Report and Written Opinion of the International Searching Authority Form PCT/ISA/210, 220, and 237), mailed in connection with PCT Application No. PCT/JP2017/024856 dated Sep. 19, 2017, 8 pages.

JPOA—Office Action of Japanese Patent Application No. 2019-528291 dated Jan. 19, 2021 with Full Machine Translation. **Reference cited in the JPOA was previously submitted in the IDS filed on Dec. 10, 2019.

* cited by examiner s1: SCREEN COORDINATE SYSTEM ON MEASUREMENT SIDE
w1: WINDOW COORDINATE SYSTEM ON MEASUREMENT SIDE
c1: CONTENT COORDINATE SYSTEM ON MEASUREMENT SIDE
$D^{s1}$: USER POSITION COORDINATES ON MEASUREMENT SIDE

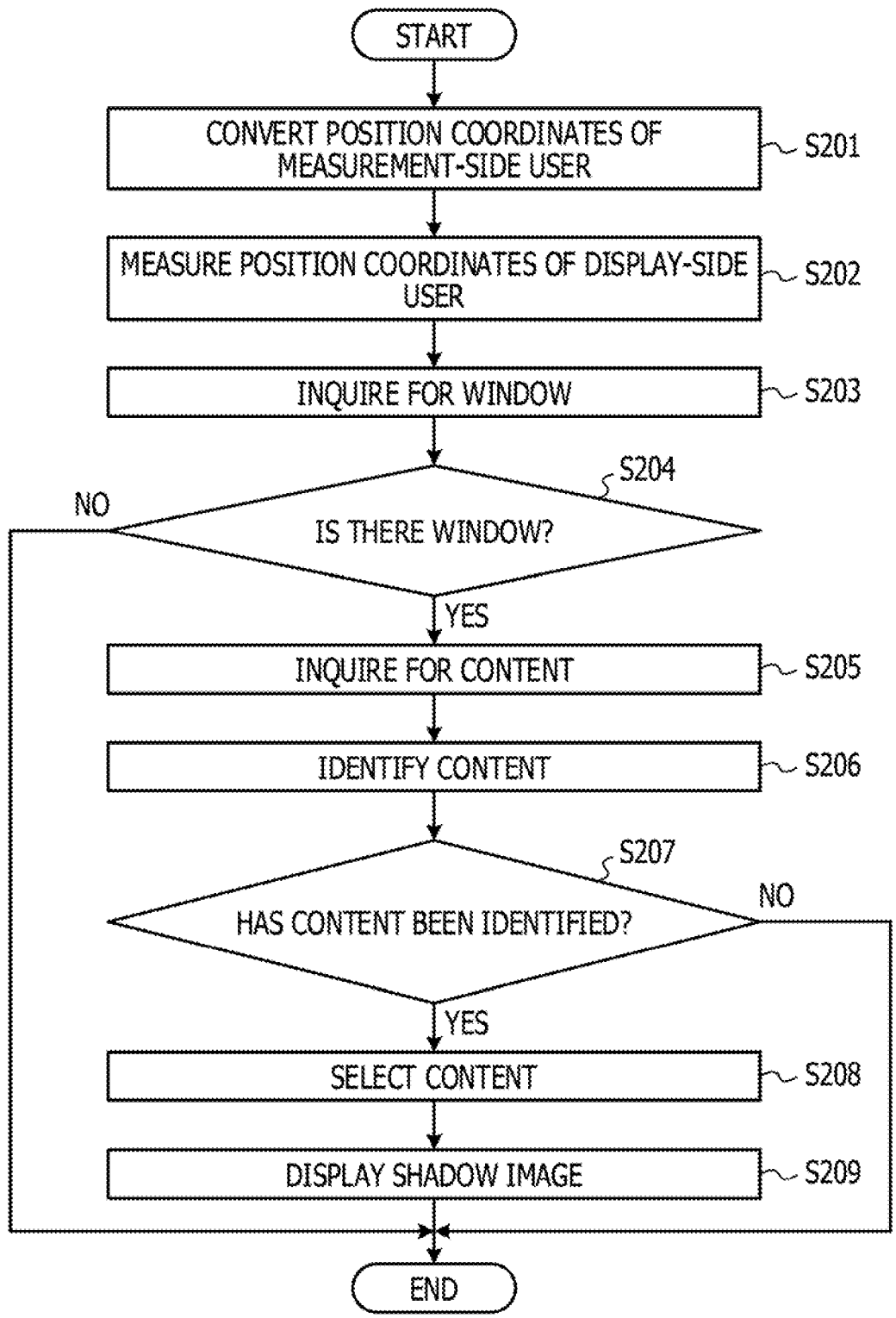

s2: SCREEN COORDINATE SYSTEM ON DISPLAY SIDE
w2: WINDOW COORDINATE SYSTEM ON DISPLAY SIDE
c1,c2: CONTENT COORDINATE SYSTEM ON DISPLAY SIDE
$D^{s2}$: SHADOW IMAGE POSITION COORDINATES ON DISPLAY SIDE

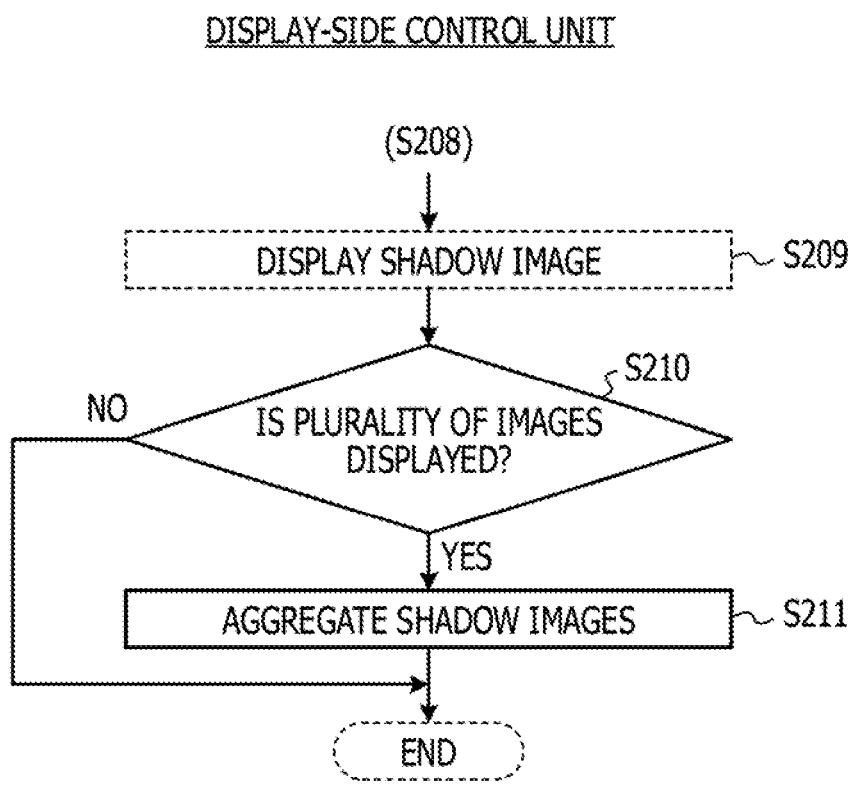

INFORMATION PROCESSING APPARATUS, INFORMATION PROCESSING METHOD, AND RECORDING MEDIUM RECORDING INFORMATION PROCESSING PROGRAM

CROSS-REFERENCE TO RELATED APPLICATION

This application is a continuation application of International Application PCT/JP2017/024856 filed on Jul. 6, 2017 and designated the U.S., the entire contents of which are incorporated herein by reference.

FIELD

The embodiment relates to an information processing apparatus, an information processing method, and an information processing program.

BACKGROUND

An electronic conference system is performed by using a projector with a camera.

Related art is disclosed in Japanese Laid-open Patent Publication No. 2015-109565, International Publication Pamphlet No. WO 2016/147373, and Non-Patent Document 1: Keita Higuchi, 4 others, "ImmerseBoard: Immersive Telepresence Experience using a Digital Whiteboard", Proceedings of the ACM SIGCHI Conference on Human Factors in Computing Systems (CHI), 2015, pp. 2383 to 2392.

SUMMARY

According to an aspect of the embodiments, an information processing apparatus includes: a memory; and a processor coupled to the memory and configured to: determine, when a first apparatus displays a part of contents, whether or not a user who operates a second apparatus which is different from the first apparatus is at a position where it is possible to operate the part of the contents among the contents displayed on the first apparatus; and cause the first apparatus to display an image indicating that the user is present at the position where it is possible to operate the part of the contents based on a determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a flowchart illustrating an example of operation of a display-side control unit.

FIG. 15 is a flowchart illustrating an example of a partial operation of a display-side control unit.

DESCRIPTION OF EMBODIMENTS

For example, an electronic conference system that uses a projector with a camera to notify a remote place of how a writing operation and a pointing operation performed on a whiteboard. For example, in a multi-display system, a single content image (hereinafter simply referred to as content) is displayed on the entire screen in which the display screen of a left display and the display screen of a right display are arranged.

For example, the position of a user in front of a display in a certain site is measured and an image of the user at that position on the screen of a display in another site is displayed. Thus, the user in each site can appropriately tell the other party an instruction target in a shared screen displayed on the displays of the respective sites.

However, the above-described technique only discloses a case where screens of the same size are shared. For example, there is a problem that when a user in one site performs an operation to enlarge a screen displayed on the display, an image of a user in the other site is excluded from the screen displayed on the display in the one site, and this image does not appear within the screen.

Accordingly, in one aspect, an information processing apparatus, an information processing method, and an information processing program capable of determining presence of a user at a position where a content can be operated when the content is shared by a plurality of apparatuses may be provided.

Hereinafter, modes for carrying out the present invention will be described with reference to the drawings.

First Embodiment

Figure 1:
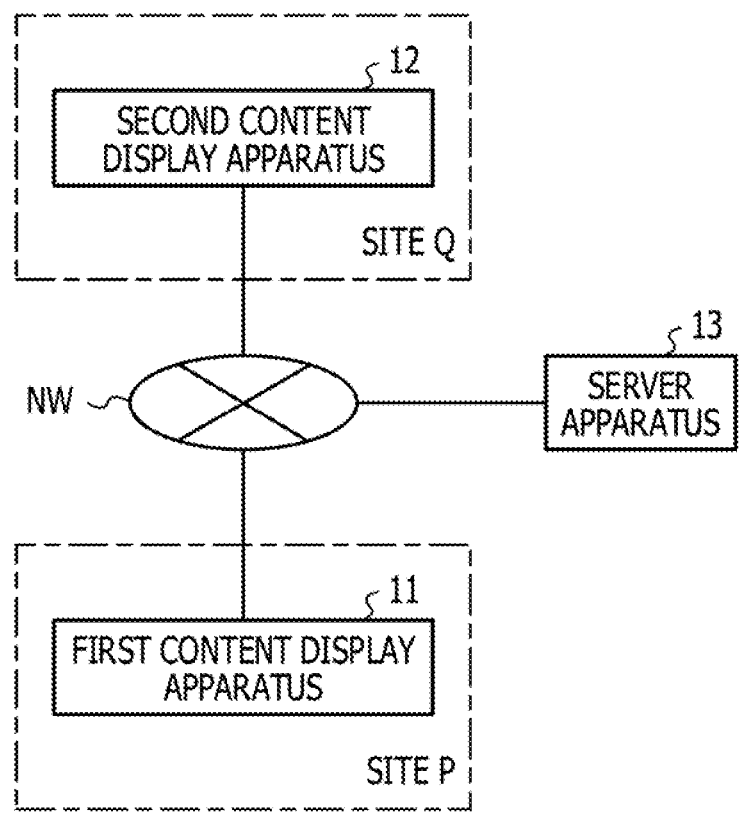
FIG. 1 is an example of an information processing system.

FIG. 1 illustrates an example of an information processing system 10. The information processing system 10 includes a first content display apparatus 11, a second content display apparatus 12, and a server apparatus 13 as an information processing apparatus.

Both the first content display apparatus 11 and the second content display apparatus 12 are devices that display content on a screen. The first content display apparatus 11 is installed, for example, in a site P, and the second content display apparatus 12 is installed, for example, in a site Q different from the site P. On the other hand, the server apparatus 13 is an apparatus that controls operation of the first content display apparatus 11 and the second content display apparatus 12. The server apparatus 13 may be installed in a site different from the site P and the site Q, or may be installed at one of the site P and the site Q. The first content display apparatus 11, the second content display apparatus 12, and the server apparatus 13 are connected to each other by a communication network NW. Examples of the communication network NW include a local area network (LAN), the Internet, and the like.

Next, a detailed configuration of the first content display apparatus 11 described above will be described with reference to FIG. 2. Note that a detailed configuration of the second content display apparatus 12 is basically similar to that of the first content display apparatus 11, and thus the description thereof is omitted.

Figure 2:
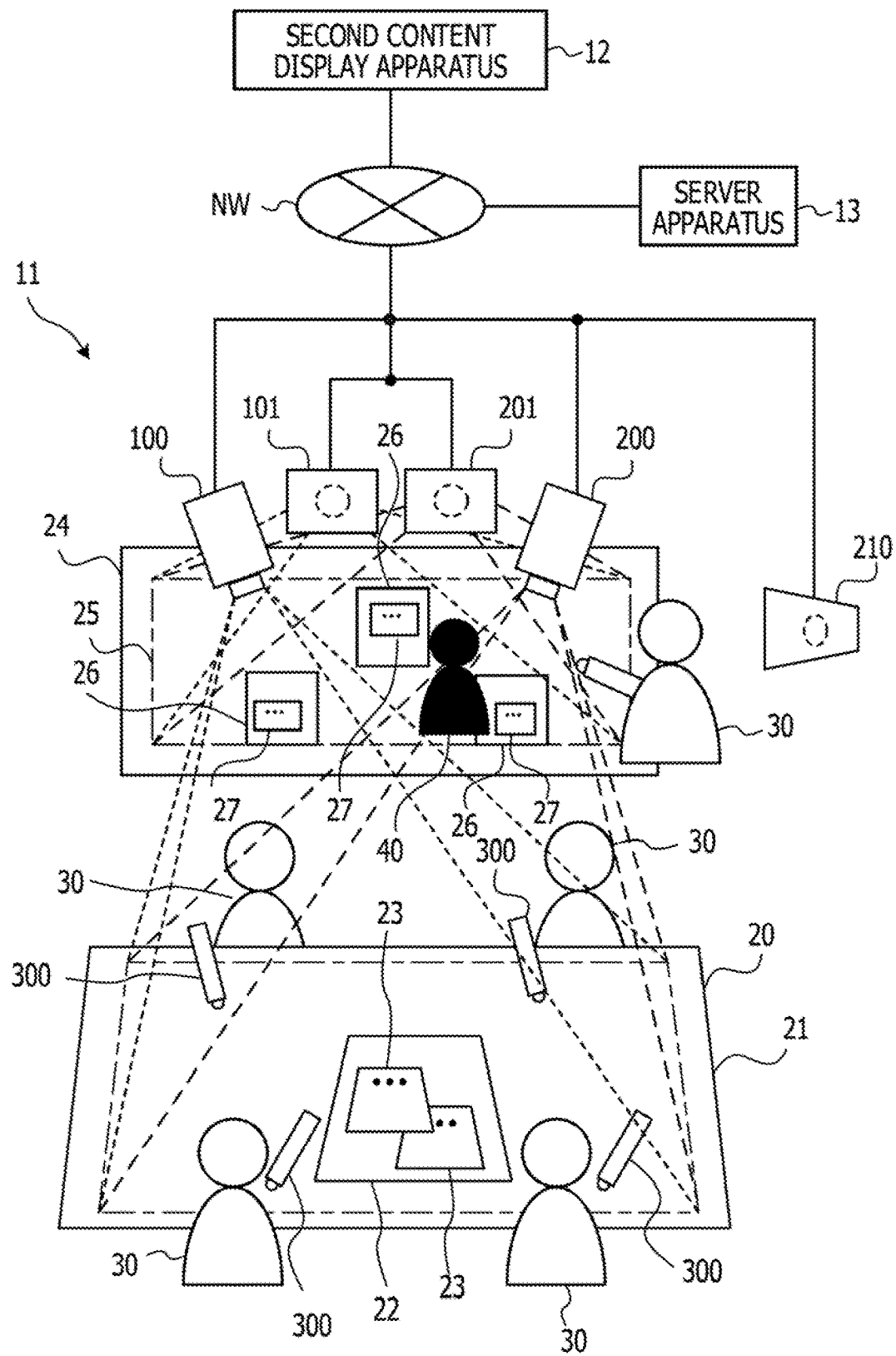
FIG. 2 is an example of a configuration of a first content display apparatus.

FIG. 2 illustrates an example of the configuration of the first content display apparatus 11. As illustrated in FIG. 2, the first content display apparatus 11 includes projectors 100, 101, infrared cameras 200, 201, a live camera 210, and an electronic pen 300. The projectors 100, 101, the infrared cameras 200, 201, and the live camera 210 are connected to each other by wire or wirelessly.

The projector 100 displays a display area (hereinafter referred to as a window) 22 for displaying a shared application in a display screen 21 on a table 20, and displays various operable contents 23 in the displayed window 22. The display screen 21 is an area where the projector 100 can display the window 22. Examples of the shared application include application software that implements imitation paper, application software that implements a personal note of a worker, and the like. On the other hand, the projector 101 displays a window 26 in a display screen 25, for example, on a wall surface or a screen (hereinafter simply referred to as a wall surface) 24 and displays various operable contents 27 in the displayed window 26. The display screen 25 is an area where the projector 101 can display the window 26. Note that the contents 23, 27 illustrated in FIG. 2 include, for example, a sticky note, a photograph, a graph, an icon, or the like. The contents 23, 27 are displayed in a predetermined size or a size specified by a user 30.

The electronic pen 300 includes a light emitting element that emits infrared light at a tip. When the electronic pen 300 is turned on, the light emitting element emits light. For example, when the user 30 takes an action of drawing a rectangle in the display screen 25 using the electronic pen 300 that emits light, the infrared camera 201 captures an infrared trajectory. For example, when the window 26 is enlarged by the user 30 using the electronic pen 300 emitting light, the infrared camera 201 captures an infrared trajectory thereof. On the other hand, the live camera 210 captures an image within an imaging area including each user 30. An example of the live camera 210 is a video camera and the like. The live camera 210 periodically transmits an image in the imaging area (hereinafter referred to as a captured image) to the server apparatus 13.

The server apparatus 13 controls operation of the projectors 100, 101. For example, when the server apparatus 13 accepts the infrared ray trajectory described above from the infrared camera 201, the server apparatus 13 determines accepted infrared ray trajectory and causes the projector 101 to display a content 27, or display the window 26 by enlarging the size of the window 26, based on a determination result. For example, when the server apparatus 13 accepts a captured image of the site Q from a live camera included in the second content display apparatus 12, the server apparatus 13 calculates position coordinates of a user in the site Q based on the accepted captured image. When the server apparatus 13 calculates the position coordinates of the user in the site Q, the server apparatus 13 causes the projector 101 to display a shadow image 40 of the user in the site Q at a position in the display screen 25 corresponding to the calculated position coordinates. Thus, the user 30 in the site P can confirm a content 27 designated as an operation target by the user in the site Q. Note that the shadow image 40 is an image corresponding to a shadow of the user in the site Q, and is represented in black, for example. However, the color of the shadow image 40 is not limited to black, and may be a color such as red or blue. Further, instead of the shadow image 40, an image imitating a user in the site Q, and the like, may be used.

Next, a hardware configuration of the server apparatus 13 will be described with reference to FIG. 3.

Figure 3:
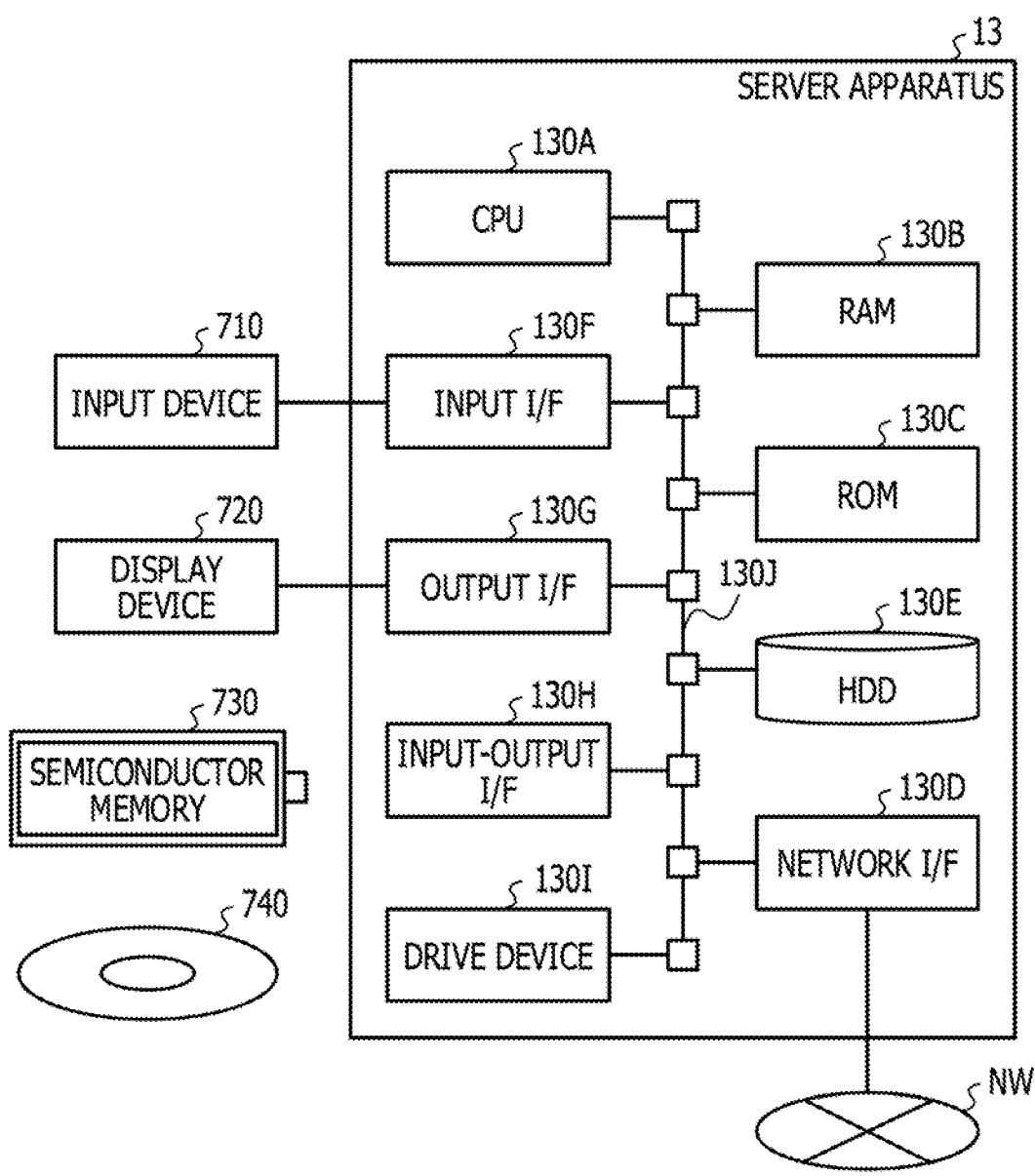
FIG. 3 is an example of a hardware configuration of a server apparatus.

FIG. 3 is an example of the hardware configuration of the server apparatus 13. As illustrated in FIG. 3, the server apparatus 13 includes at least a central processing unit (CPU) 130A as a processor, a random access memory (RAM) 130B, a read only memory (ROM) 130C, and a network interface (hereinafter referred to as I/F) 130D. The server apparatus 13 may include at least one of a hard disk drive (HDD) 130E, an input I/F 130F, an output I/F 130G, an input-output I/F 130H, and a drive device 130I as needed. The CPU 130A to the drive device 130I are connected to each other by an internal bus 130J. At least the CPU 130A and the RAM 130B cooperate to implement a computer. Note that a micro processing unit (MPU) may be used as a processor instead of the CPU 130A.

An input device 710 is connected to the input I/F 130F. Examples of the input device 710 include a keyboard, a mouse, and the like. A display device 720 is connected to an output I/F 130G. An example of the display device 720 is a liquid crystal display. A semiconductor memory 730 is connected to an input-output I/F 130H. Examples of the semiconductor memory 730 include a universal serial bus (USB) memory, a flash memory, and the like. The input-output I/F 130H reads a program and data stored in the semiconductor memory 730. The input I/F 130F and the input-output I/F 130H have, for example, USB ports. The output I/F 130G has, for example, a display port.

A portable recording medium 740 is inserted into the drive device 130I. Examples of the portable recording medium 740 include removable disks such as a compact disc (CD)-ROM and a digital versatile disc (DVD). The drive device 130I reads a program and data recorded in the portable recording medium 740. The network I/F 130D has a LAN port, for example. The network I/F 130D is connected to the communication network NW described above.

Programs stored in the ROM 130C and the HDD 130E are stored in the RAM 130B described above by the CPU 130A. A program recorded in the portable recording medium 740 is stored in the RAM 130B by the CPU 130A. By executing the stored program by the CPU 130A, various functions to be described later are implemented and various processes to be described later are executed. Note that the program only have to be in accordance with flowcharts to be described later.

Next, the functional configuration of the server apparatus 13 will be described with reference to FIG. 4.

Figure 4:
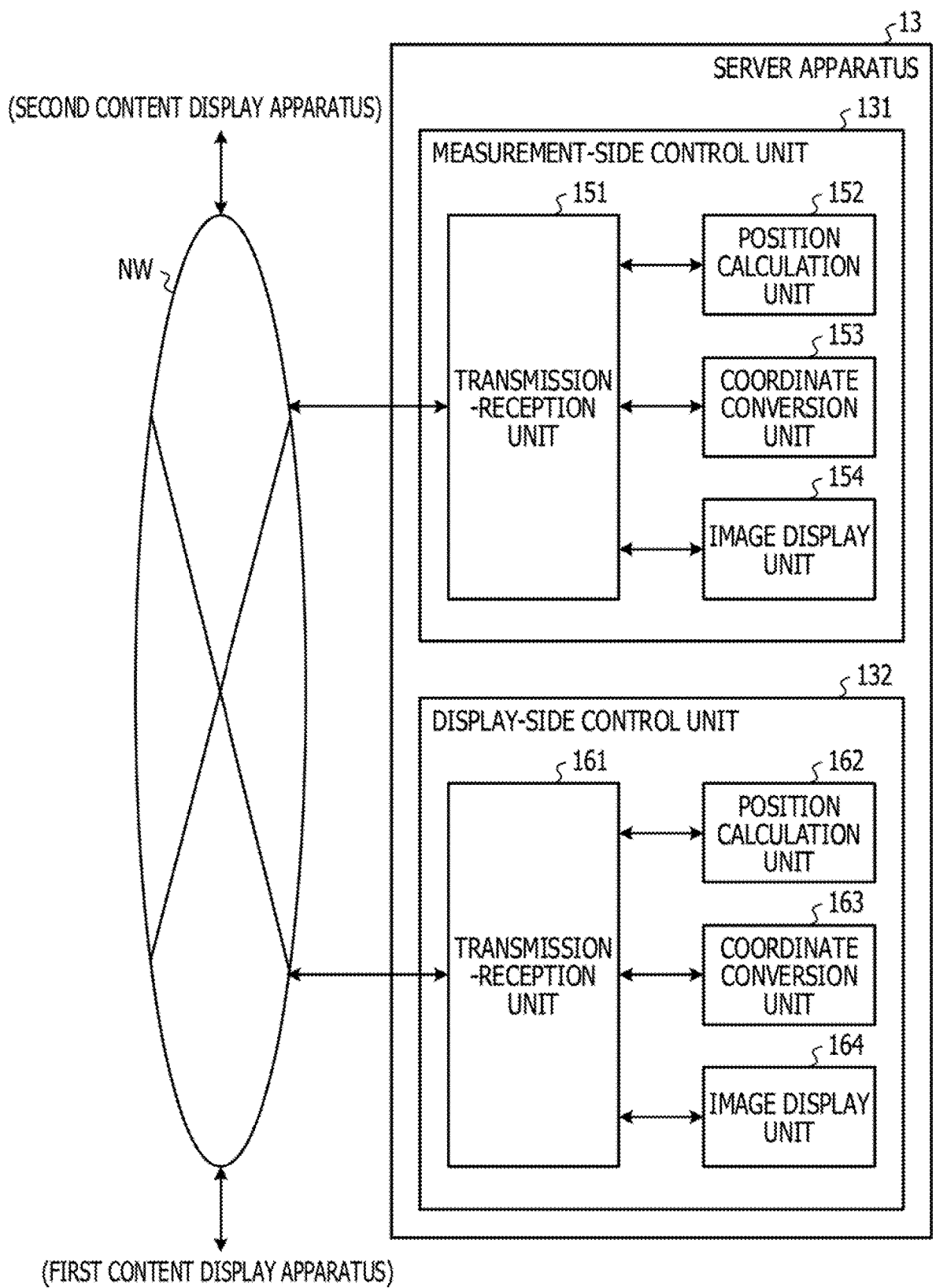
FIG. 4 is an example of a block diagram of the server apparatus.

FIG. 4 is an example of a block diagram of the server apparatus 13. As illustrated in FIG. 4, the server apparatus 13 includes a measurement-side control unit 131 and a display-side control unit 132 as processing units. In the present embodiment, one server apparatus 13 includes the measurement-side control unit 131 and the display-side control unit 132, but the server apparatus 13 may include the measurement-side control unit 131, and another server apparatus (not illustrated) may include the display-side control unit 132 separately. In this case, the server apparatus 13 including the measurement-side control unit 131 may be disposed in the site Q, and the other server apparatus including the display-side control unit 132 may be disposed in the site P.

The measurement-side control unit 131 includes a transmission-reception unit 151, a position calculation unit 152, a coordinate conversion unit 153, and an image display unit 154. The display-side control unit 132 includes a transmission-reception unit 161, a position calculation unit 162, a coordinate conversion unit 163, and an image display unit 164. Note that the transmission-reception units 151, 161 are achieved by the network I/F 130D described above, for example. The position calculation units 152, 162, the coordinate conversion units 153, 163, and the image display units 154, 164 are achieved by the CPU 130A and the RAM 130B described above, for example.

First, the measurement-side control unit 131 will be described.

The transmission-reception unit 151 controls communication between the transmission-reception unit 161 and the second content display apparatus 12 with the position calculation unit 152, the coordinate conversion unit 153, and the image display unit 154. Specifically, the transmission-reception unit 151 receives various types of information transmitted from the transmission-reception unit 161 and the second content display apparatus 12. Then, the transmission-reception unit 151 outputs the information to the position calculation unit 152, the coordinate conversion unit 153, or the image display unit 154 according to the type of the received information. Further, the transmission-reception unit 151 accepts various types of information output from the position calculation unit 152, the coordinate conversion unit 153, or the image display unit 154. Then, the transmission-reception unit 151 transmits the information to the transmission-reception unit 161 or the second content display apparatus 12 according to the type of the accepted information.

When the position calculation unit 152 accepts information output from the transmission-reception unit 151, the position calculation unit 152 calculates position coordinates of the user in the site Q (hereinafter referred to as a measurement-side user) based on the accepted information. For example, when the position calculation unit 152 accepts a captured image captured by a live camera (not illustrated) included in the second content display apparatus 12, the position calculation unit 152 calculates position coordinates of the head, fingertip, center of gravity, and so on of the measurement-side user in a planar coordinate system (hereinafter referred to as a screen coordinate system) with an upper left corner of the display screen of the site Q being an origin.

When the coordinate conversion unit 153 accepts information output from the transmission-reception unit 151, the coordinate conversion unit 153 converts the position coordinates of the measurement-side user in the screen coordinate system of the site Q into position coordinates of the measurement-side user in a planar coordinate system (referred to as a window coordinate system) with an upper left corner of the window being an origin, based on the accepted information. Further, the coordinate conversion unit 153 converts the position coordinates of the measurement-side user in the window coordinate system into the position coordinates of the measurement-side user in a planar coordinate system (hereinafter referred to as a content coordinate system) with an upper left corner of the content being an origin.

When the image display unit 154 accepts information output from the transmission-reception unit 151, the image display unit 154 executes various information processing based on the accepted information. For example, the image display unit 154 inquires the second content display apparatus 12 about windows present within a predetermined distance that represents a range of reach of hand by the measurement-side user from the position of the measurement-side user in the screen coordinate system. For example, the image display unit 154 displays a shadow image (not illustrated) of a user in the site P (hereinafter referred to as a display-side user) on a wall surface of the site Q or the like.

Next, the display-side control unit 132 will be described.

The transmission-reception unit 161 controls communication between the transmission-reception unit 151 and the first content display apparatus 11 with the position calculation unit 162, the coordinate conversion unit 163, and the image display unit 164. Specifically, the transmission-reception unit 161 receives various types of information transmitted from the transmission-reception unit 151 and the first content display apparatus 11. Then, the transmission-reception unit 161 outputs the information to the position calculation unit 162, the coordinate conversion unit 163, or the image display unit 164 according to the type of the received information. Further, the transmission-reception unit 161 accepts various types of information output from the position calculation unit 162, the coordinate conversion unit 163, or the image display unit 164. Then, the transmission-reception unit 161 transmits the information to the transmission-reception unit 151 or the first content display apparatus 11 according to the type of information accepted.

When the position calculation unit 162 accepts information output from the transmission-reception unit 161, the position calculation unit 162 calculates position coordinates of the display-side user 30 based on the accepted information. For example, when the position calculation unit 162 accepts a captured image captured by the live camera 210 included in the first content display apparatus 11, the position calculation unit 162 calculates position coordinates of the head, fingertip, center of gravity, and so on of the display-side user 30 in a screen coordinate system of the site P.

When the coordinate conversion unit 163 accepts information output from the transmission-reception unit 161, the coordinate conversion unit 163 converts the position coordinates of the display-side user 30 in the screen coordinate system of the site P into position coordinates of the display-side user 30 in a window coordinate system of the site P, based on the accepted information. Further, the coordinate conversion unit 163 converts the position coordinates of the display-side user 30 in the window coordinate system of the site P into position coordinates of the display-side user 30 in a content coordinate system of the site P.

When the image display unit 164 accepts information output from the transmission-reception unit 151, the image display unit 164 executes various information processing based on the accepted information. For example, the image display unit 164 inquires the first content display apparatus 11 about windows present within a predetermined distance that represents a range of reach of hand by the measurement-side user from the position of the measurement-side user in the screen coordinate system. For example, the image display unit 164 displays a shadow image 40 of the measurement-side user on a wall surface 24 of the site P or the like.

Next, operation of the information processing system 10 will be described.

Figure 5:
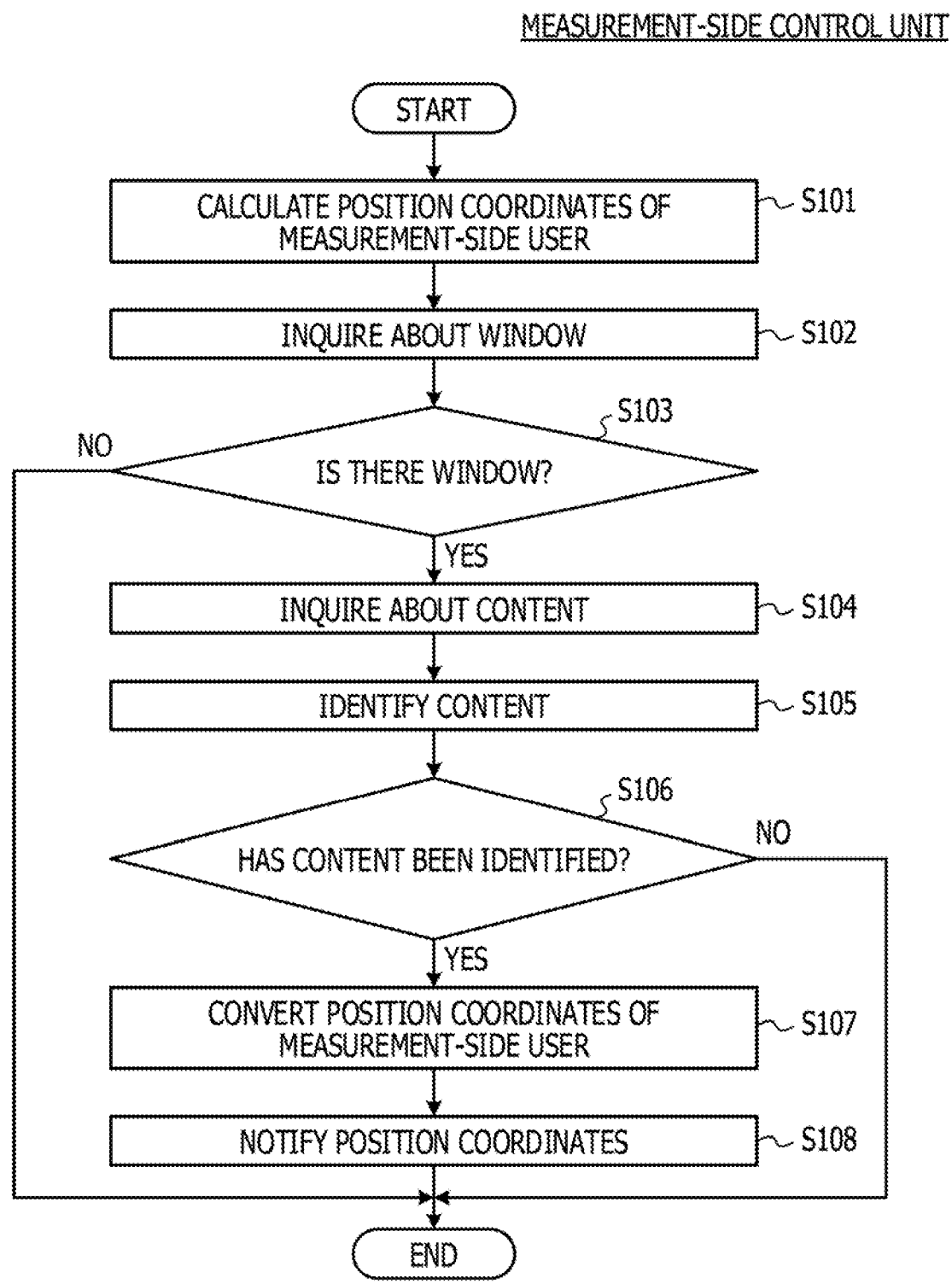
FIG. 5 is a flowchart illustrating an example of operation of a measurement-side control unit.
Figure 6:
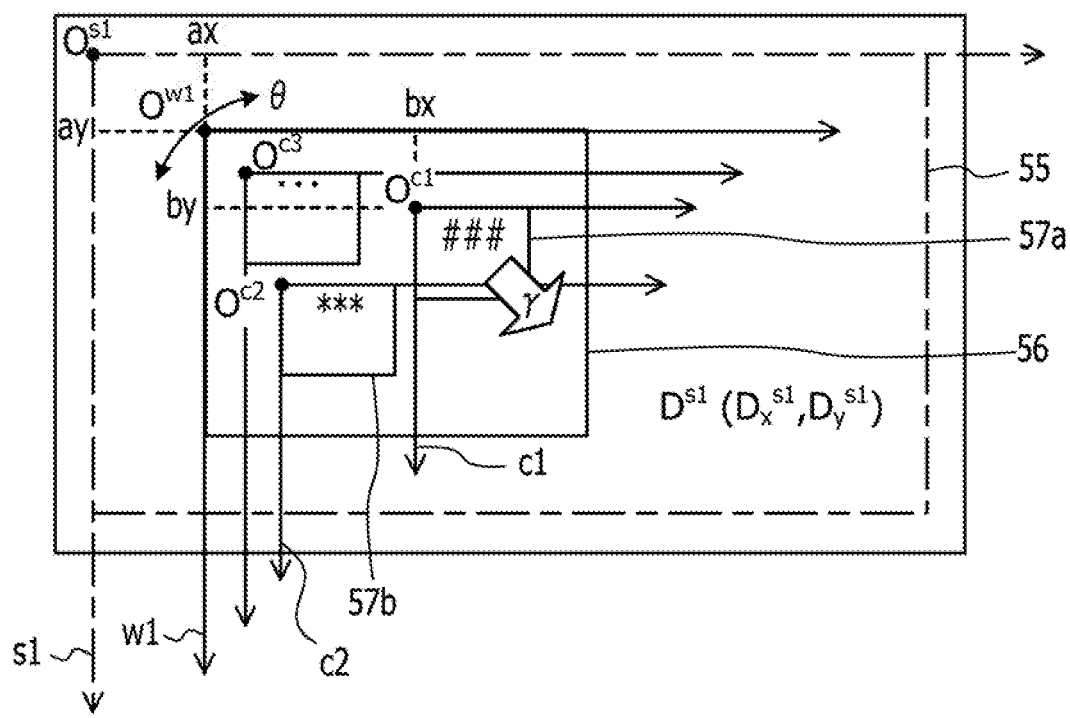
FIG. 6 is a view for explaining coordinate conversion on a measurement side.
Figure 7A:
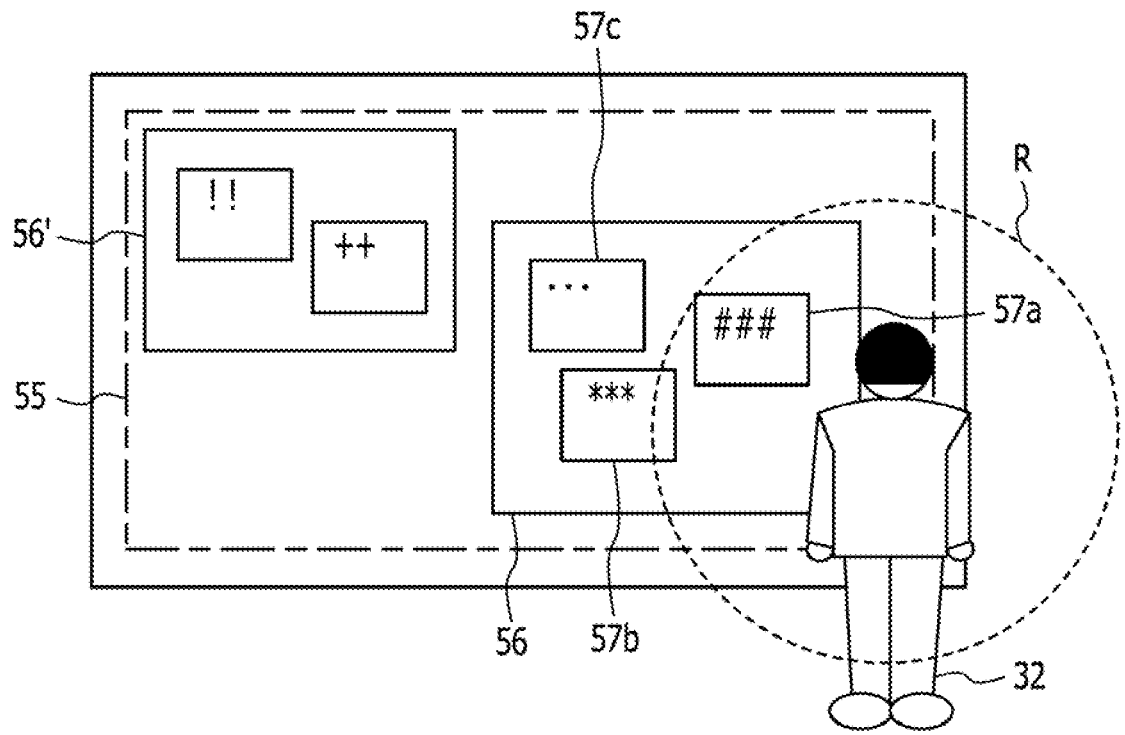
FIGS. 7A and 7B are views for explaining screen sharing between the measurement side and a display side.
Figure 7B:
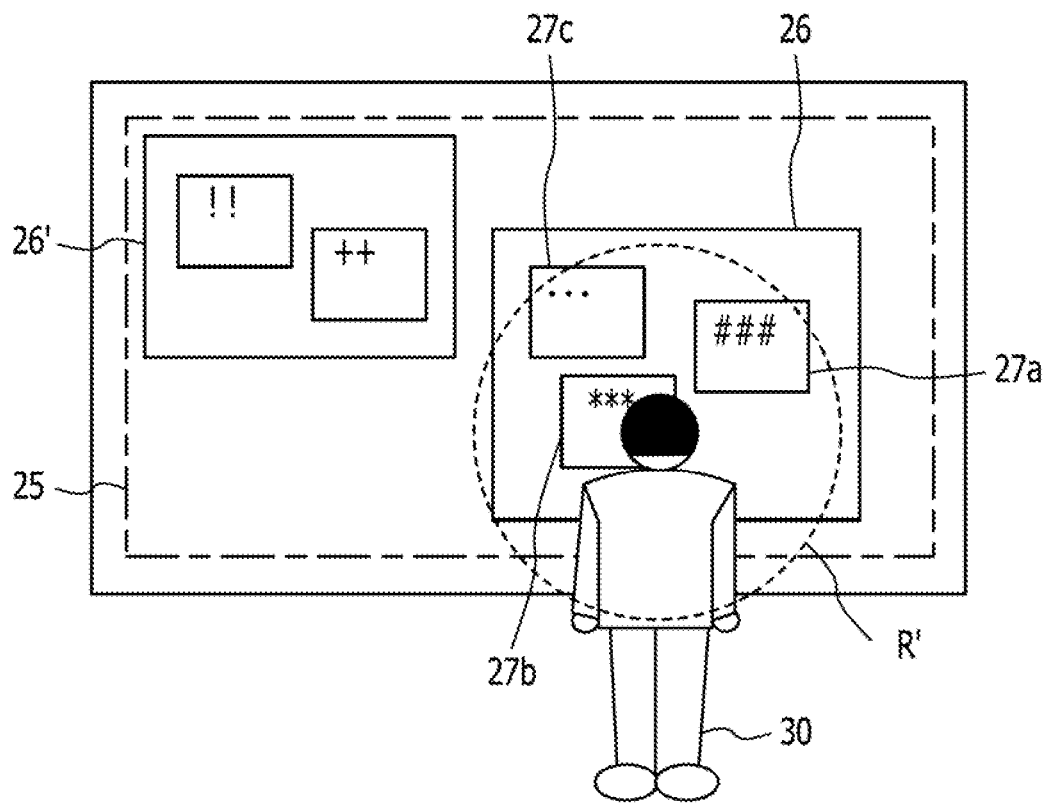

FIG. 5 is a flowchart illustrating an example of operation of the measurement-side control unit 131. FIG. 6 is a view for explaining coordinate conversion on the measurement side. FIGS. 7A and 7B are views for explaining screen sharing between the measurement side and the display side.

First, as illustrated in FIG. 5, the position calculation unit 152 calculates position coordinates of a measurement-side user (step S101). More specifically, when the position calculation unit 152 accepts a captured image captured by the live camera of the second content display apparatus 12, the position calculation unit 152 calculates position coordinates in the screen coordinate system of the measurement-side user included in the display screen of the site Q from the captured image. For example, as illustrated in FIG. 6, when the position calculation unit 152 accepts the captured image, the position calculation unit 152 calculates position coordinates $D^{s1}$ ($D_x^{s1}$, $D_y^{s1}$) of the measurement-side user in a screen coordinate system s1 of a display screen 55 with an upper left corner being an origin $O^{s1}$.

When processing of step S101 is completed, the image display unit 154 then inquires the second content display apparatus 12 about windows present within a range of a predetermined distance (for example, a radius of 1 meter) from the position coordinates $D^{s1}$ ($D_x^{s1}$, $D_y^{s1}$) (step S102). Then, the image display unit 154 determines whether or not there is a window within the range of the predetermined distance from the position coordinates $D^{s1}$ ($D_x^{s1}$, $D_y^{s1}$) (step S103). When there is no window within the range of the predetermined distance from the position coordinates $D^{s1}$ ($D_x^{s1}$, $D_y^{s1}$) (NO in step S103), the image display unit 154 skips the subsequent process and ends the process.

On the other hand, when there is a window present within the range of the predetermined distance from the position coordinates $D^{s1}$ ($D_x^{s1}$, $D_y^{s1}$) (YES in step S103), the image display unit 154 inquires a shared application displayed in all windows within the range of the predetermined distance from the position coordinates $D^{s1}$ about positions of contents (step S104). For example, as illustrated in FIGS. 7A and 7B, when the display screens 55, 25 are shared between the measurement side representing the site Q and the display side representing the site P, a measurement-side window 56 is partially included within a range R of the predetermined distance from the position coordinate $D^{s1}$ of the measurement-side user 32. On the other hand, the measurement-side window 56' is not included in the range R of the predetermined distance. In such a case, the image display unit 154 inquires the shared application displayed in the window 56 about positions of contents 57a, 57b, 57c.

When processing in step S104 is completed, the image display unit 154 then identifies a content present within the range of the predetermined distance from the position coordinates $D^{s1}$ ($D_x^{s1}$, $D_y^{s1}$) from positions of all contents answered from the shared application based on a result of inquiry (step S105). Then, the image display unit 154 determines whether a content has been identified or not (step S106). When the content has not been identified (NO in step S106), the image display unit 154 skips the subsequent process and terminates the process.

On the other hand, when the content has been identified (YES in step S106), the coordinate conversion unit 153 converts the position coordinates $D^{s1}$ ($D_x^{s1}$, $D_y^{s1}$) of the measurement-side user (step S107). For example, as illustrated in FIG. 7A, when the contents 57a, 57b are included within the range R of the predetermined distance from the position coordinates $D^{s1}$, and the content 57c is not included in the range R of the predetermined distance from the position coordinates $D^{s1}$, the image display unit 154 identifies the contents 57a, 57b. Then, the coordinate conversion unit 153 converts the position coordinates $D^{s1}$ ($D_x^{s1}$, $D_y^{s1}$) into position coordinates $C^{c1}$ ($C_x^{c1}$, $C_y^{c1}$) in a content coordinate system c1 of the content 57a identified by the image display unit 154 and position coordinates $C^{c2}$ ($C_x^{c2}$, $C_y^{c2}$) in a content coordinate system c2 of the content 57b.

More specifically, based on the following conversion formula (1) using affine transformation, as illustrated in FIG. 6, the coordinate conversion unit 153 converts the position coordinates $D^{s1}$ ($D_x^{s1}$, $D_y^{s1}$) of the measurement-side user in the screen coordinate system s1 into position coordinates $W^{w1}$ ($W_x^{w1}$, $W_y^{w1}$) of the measurement-side user in a window coordinate system w1. Note that a rotation angle θ represents a rotation angle of the window 56, and coordinates ($a_x$, $a_y$) represent coordinates $O^{w1}$ of an upper left corner of the window 56 in the screen coordinate system s1.

$$\begin{pmatrix} W_x^{w1} \\ W_y^{w2} \end{pmatrix} = \begin{pmatrix} \cos\theta & \sin\theta \\ -\sin\theta & \cos\theta \end{pmatrix} \begin{pmatrix} D_x^{s1} \\ D_y^{s1} \end{pmatrix} - \begin{pmatrix} a_x \\ a_y \end{pmatrix} \quad \langle\text{Conversion formula (1)}\rangle$$

Next, based on the following conversion formula (2), the coordinate conversion unit 153 converts the position coordinates $W^{w1}$ ($W_x^{w1}$, $W_y^{w1}$) of the measurement-side user in the window coordinate system w1 into the position coordinates $C^{c1}$ ($C_x^{c1}$, $C_y^{c1}$) of the measurement-side user in the content coordinate system c1. Note that coordinates ($b_x$, $b_y$) represent coordinates $O^{c1}$ of an upper left corner of the content 54 in the window coordinate system w1. Further, the coordinate conversion unit 153 can convert the position coordinates $W^{w1}$ ($W_x^{w1}$, $W_y^{w1}$) of the measurement-side user in the window coordinate system w1 into the position coordinates $C^{c2}$ ($C_x^{c2}$, $C_y^{c2}$) of the measurement-side user in the content coordinate system c2 by a similar method.

$$\begin{pmatrix} C_x^{c1} \\ C_y^{c1} \end{pmatrix} = \frac{1}{\gamma}\left(\begin{pmatrix} W_x^{w1} \\ W_y^{w1} \end{pmatrix} - \begin{pmatrix} b_x \\ b_y \end{pmatrix}\right) \quad \langle\text{Conversion formula (2)}\rangle$$

Returning to FIG. 5, when processing of step S107 is completed, the transmission-reception unit 151 transmits the position coordinates $C^{c1}$ ($C_x^{c1}$, $C_y^{c1}$) to the transmission-reception unit 161 together with an application ID for identifying the shared application and a content ID for identifying the content. (Step S108), and the process ends. Note that the transmission-reception unit 151 similarly transmits the position coordinates $C^{c2}$ ($C_x^{c2}$, $C_y^{c2}$).

Figure 9:
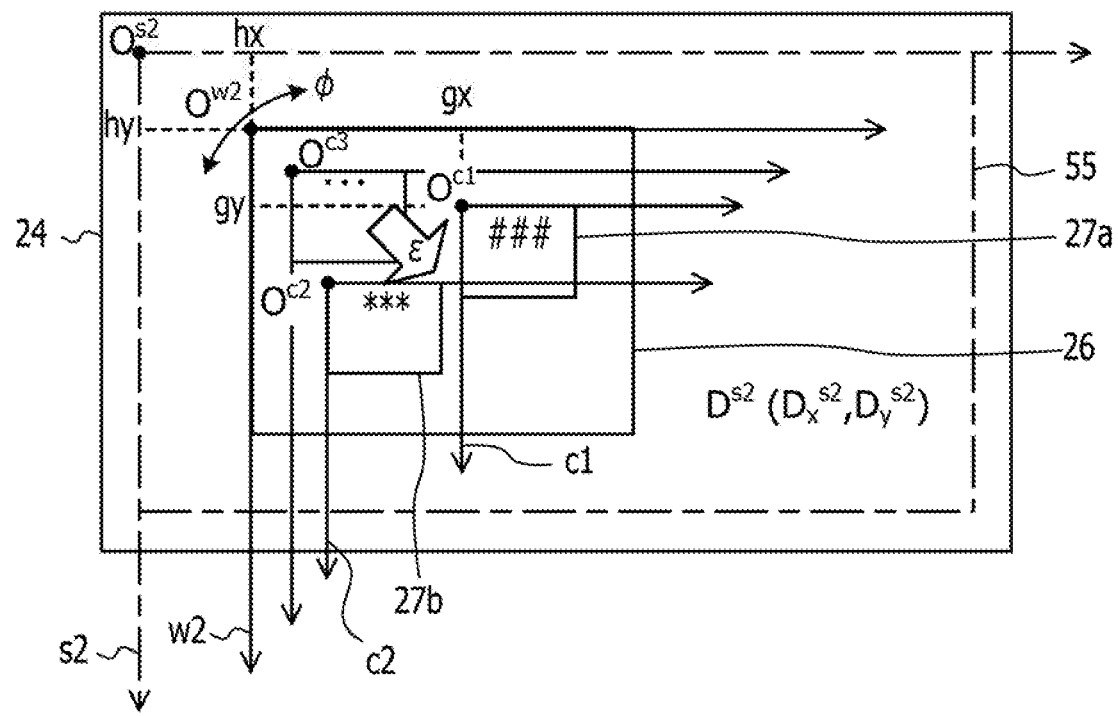
FIG. 9 is a view for explaining coordinate conversion on the measurement side.
Figure 10A:
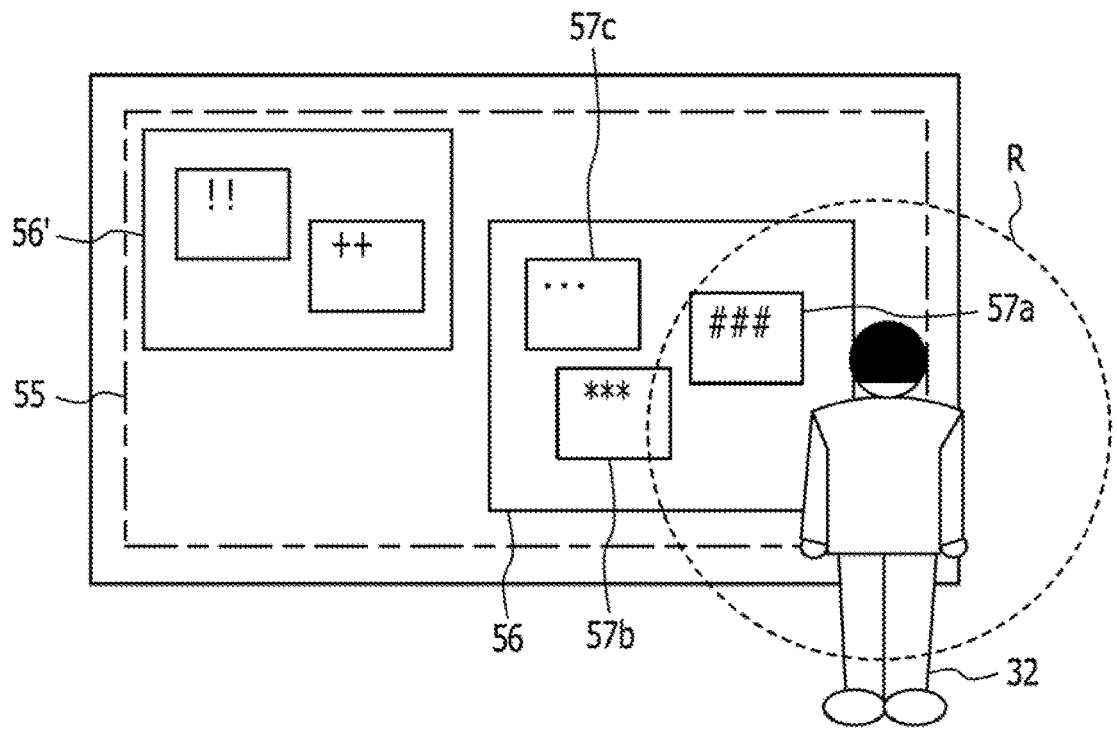
FIGS. 10A and 10B are display examples of shadow images when entire content is displayed without enlarging a window.
Figure 10B:
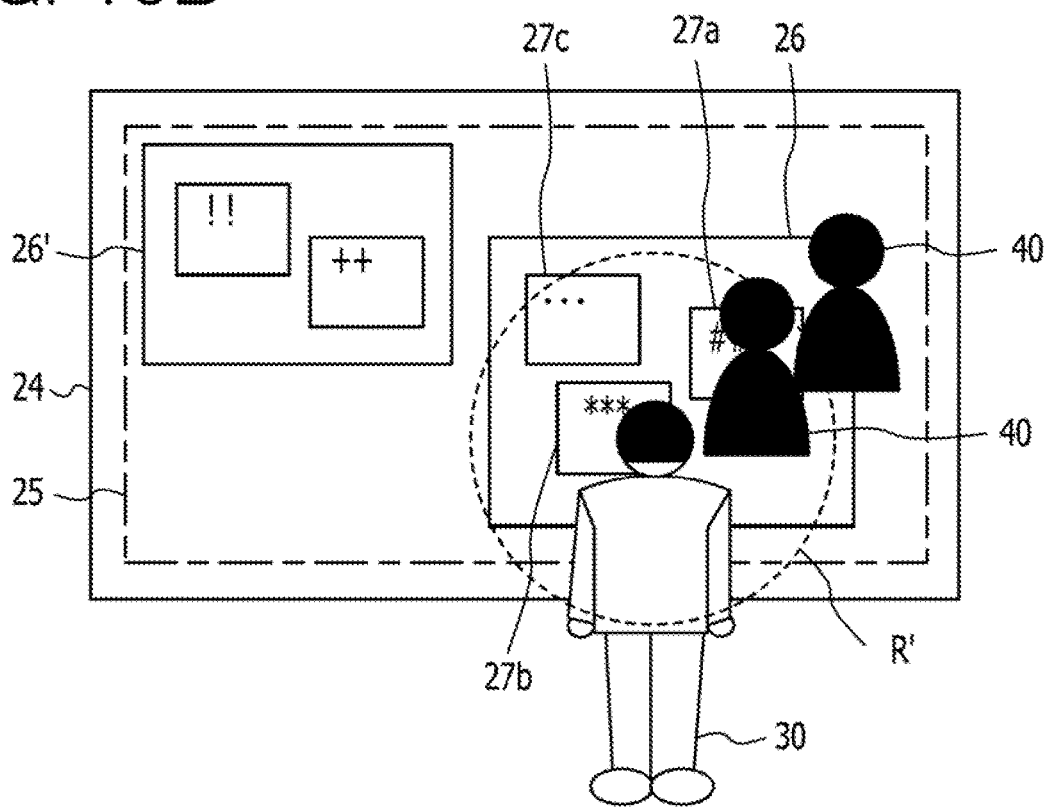

FIG. 8 is a flowchart illustrating an example of the operation of the display-side control unit 131. FIG. 9 is a view for explaining coordinate conversion on the measurement side. FIGS. 10A and 10B are display examples of the shadow image 40 when all of contents 27a, 27b, 27c are displayed without enlarging the window 26.

First, as illustrated in FIG. 8, the coordinate conversion unit 163 converts position coordinates of a measurement-side user in the content coordinate system (step S201). Specifically, the coordinate conversion unit 163 converts position coordinates $C^{c1}$ ($C_x^{c1}$, $C_y^{c1}$) transmitted from the transmission-reception unit 151 and received by the transmission-reception unit 161 into position coordinates $D^{s2}$ ($D_x^{s2}$, $D_y^{s2}$) in a screen coordinate system s2.

More specifically, based on the following conversion formula (3), the coordinate conversion unit 163 converts the position coordinates $C^{c1}$ ($C_x^{c1}$, $C_y^{c1}$) of the measurement-side user in the content coordinate system c1 into position coordinates $W^{w2}$ ($W_x^{w2}$, $W_y^{w2}$) of the measurement-side user in a window coordinate system w2, as illustrated in FIG. 9. Note that coordinates ($g_x$, $g_y$) represent coordinates $O^{c1}$ of an upper left corner of the content 27a in the window coordinate system w2.

$$\begin{pmatrix} W_x^{w2} \\ W_y^{w2} \end{pmatrix} = \varepsilon \left( \begin{pmatrix} C_x^{c1} \\ C_y^{c1} \end{pmatrix} + \begin{pmatrix} g_x \\ g_y \end{pmatrix} \right) \quad \langle \text{Conversion formula (3)} \rangle$$

Next, based on the following conversion formula (4) using inverse affine transformation, the coordinate conversion unit 163 converts the position coordinates $W^{w2}$ ($W_x^{w2}$, $W_y^{w2}$) of the measurement-side user in the window coordinate system w2 into the position coordinates $D^{s2}$ ($D_x^{s2}$, $D_y^{s2}$) of the measurement-side user in the screen coordinate system s2. Note that the rotation angle φ represents a rotation angle of the window coordinate system w2, and the coordinates ($h_x$, $h_y$) represent origin coordinates $O^{w2}$ of an upper left corner of the window in the screen coordinate system s2.

$$\begin{pmatrix} D_x^{s2} \\ D_y^{s2} \end{pmatrix} = \begin{pmatrix} \cos\phi & -\sin\phi \\ \sin\phi & \cos\phi \end{pmatrix} \begin{pmatrix} W_x^{w2} \\ W_y^{w2} \end{pmatrix} + \begin{pmatrix} h_x \\ h_y \end{pmatrix} \quad \langle \text{Conversion formula (4)} \rangle$$

Note that the conversion formula (3) described above may be changed to the following conversion formula (3'). Thus, the physical size of the shadow image can be made the same in the both sites P, Q.

$$\begin{pmatrix} W_x^{w2} \\ W_y^{w2} \end{pmatrix} = \gamma \left( \begin{pmatrix} C_x^{c1} \\ C_y^{c1} \end{pmatrix} + \begin{pmatrix} g_x \\ g_y \end{pmatrix} \right) \quad \langle \text{Conversion formula (3')} \rangle$$

When processing of step S201 is completed, the position calculation unit 162 then calculates position coordinates of a display-side user (step S202). More specifically, when the position calculation unit 162 accepts a captured image captured by the live camera 210 of the first content display apparatus 11, the position calculation unit 162 calculates position coordinates in the screen coordinate system s2 of the display-side user 30 included in the display screen 15 of the site P from the captured image. For example, as illustrated in FIG. 9, when the position calculation unit 162 accepts a captured image, the position calculation unit 162 calculates position coordinates $E^{s2}$ ($E_x^{s2}$, $E_y^{s2}$) of the display-side user 30 in the screen coordinate system s2 of the display screen 15 with an upper left corner being an origin $O^{s2}$.

When processing of step S202 is completed, the image display unit 164 then inquires the first content display apparatus 11 about windows present within a range of a predetermined distance from the position coordinates $E^{s2}$ ($E_x^{s2}$, $E_y^{s2}$) (step S203). Then, the image display unit 164 determines whether there is a window or not within the range of the predetermined distance from the position coordinates $E^{s2}$ ($E_x^{s2}$, $E_y^{s2}$) (step S204). When there is no window within the range of the predetermined distance from the position coordinates $E^{s2}$ ($E_x^{s2}$, $E_y^{s2}$) (NO in step S204), the image display unit 164 skips the subsequent process and ends the process.

On the other hand, when there is a window present within the range of the predetermined distance from the position coordinates $E^{s2}$ ($E_x^{s2}$, $E_y^{s2}$) (YES in step S204), the image display unit 164 inquires the shared application that is displayed in each of all windows within the range of the predetermined distance from the position coordinates $E^{s2}$ about positions of contents (step S205). For example, as illustrated in FIG. 7B, the display-side window 26 is partially included within a range R' of the predetermined distance from the position coordinates $E^{s2}$ of the display-side user 30. On the other hand, the display-side window 26' is not included in the range R' of the predetermined distance. In such a case, the image display unit 164 inquires the shared application displayed in the window 26 about positions of contents 27a, 27b, 27c.

When processing of step S205 is completed, the image display unit 154 then identifies a content present within the range of the predetermined distance from the position coordinates $E^{s2}$ ($E_x^{s2}$, $E_y^{s2}$) from positions of all contents answered from the shared application based on a result of inquiry (step S206). Then, the image display unit 154 determines whether a content has been identified or not (step S207). When the content has not been identified (NO in step S207), the image display unit 164 skips the subsequent process and ends the process.

On the other hand, when the content has been identified (YES in step S207), the image display unit 164 selects the identified content (step S208) and displays a shadow image (step S209). Thus, as illustrated in FIGS. 10A and 10B, shadow images are displayed near the selected contents 27a, 27b. More specifically, the shadow images 40 are displayed for the contents 27a, 27b corresponding to the contents 57a, 57b present within the range R of the predetermined distance that the measurement-side user 32 can reach by hand. On the other hand, no shadow image is displayed on the window 26' corresponding to the window 56' that is not within the range R of the predetermined distance that the measurement-side user 32 can reach by hand or on the content 27c corresponding to the content 56c. As described above, the image display unit 164 displays the shadow image 40 in units of shared applications and units of contents. Thus, the display-side user 30 in the site P can confirm by the shadow image 40 the contents 57a, 57b scheduled to be designated as an operation target by the measurement-side user 32 in the site Q.

Hereinafter, various display examples of the shadow image 40 will be described with reference to FIGS. 11A and 11B to FIGS. 14A and 14B.

Figure 11A:
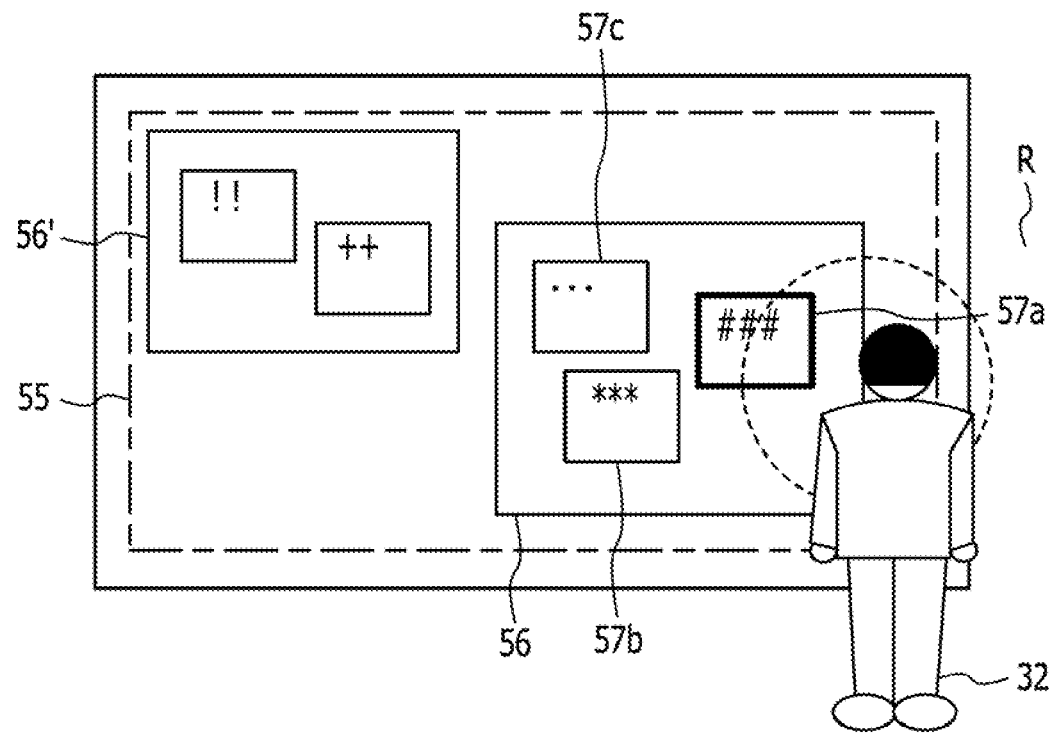
FIGS. 11A and 11B are display examples of a shadow image when a window is enlarged and a part of content is displayed.
Figure 11B:
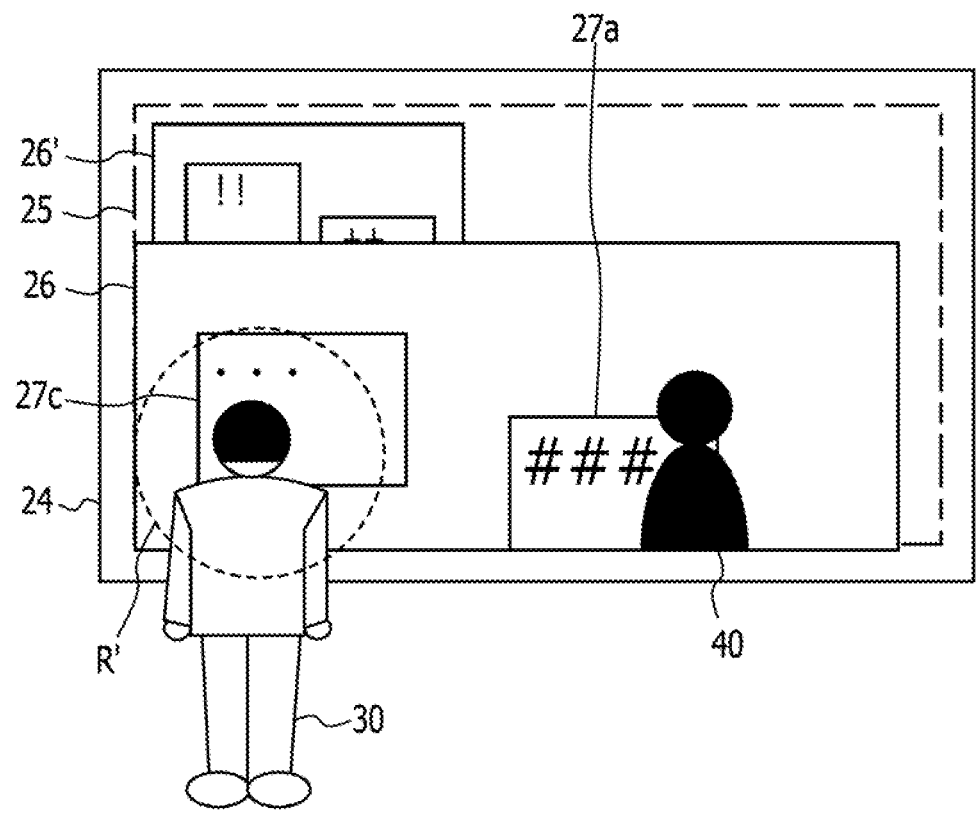

FIGS. 11A and 11B to FIGS. 14A and 14B are display examples of the shadow image 40 when the window 26 is enlarged to display a part of the contents 27a, 27b, 27c. First, as illustrated in FIG. 11A, when the content 57a is included in the range R of the predetermined distance that the measurement-side user 32 can reach by hand, as illustrated in FIG. 11B, the image display unit 164 displays the shadow image 40 near the content 27a corresponding to the content 57a. In particular, without using the positional relationship between the display position of the display screen 55 and the position coordinates $D^{s1}$ of the measurement-side user 32 or the positional relationship between the display position of the window 56 and the position coordinates $D^{w1}$ of the measurement-side user 32, the image display unit 164 displays the shadow image 40 near the content 27a using the positional relationship between the display position of the content 57a and the position coordinates $D^{c1}$ of the measurement-side user 32. Thus, the problem that the shadow image 40 does not appear on the display screen 55 when the window 26 is enlarged is avoided. Note that although details will be described later, in a case illustrated in FIG. 11B, the shadow image 40 is displayed for the content 27a outside the range R' of the predetermined distance that the display-side user 30 can reach by hand.

Figure 12A:
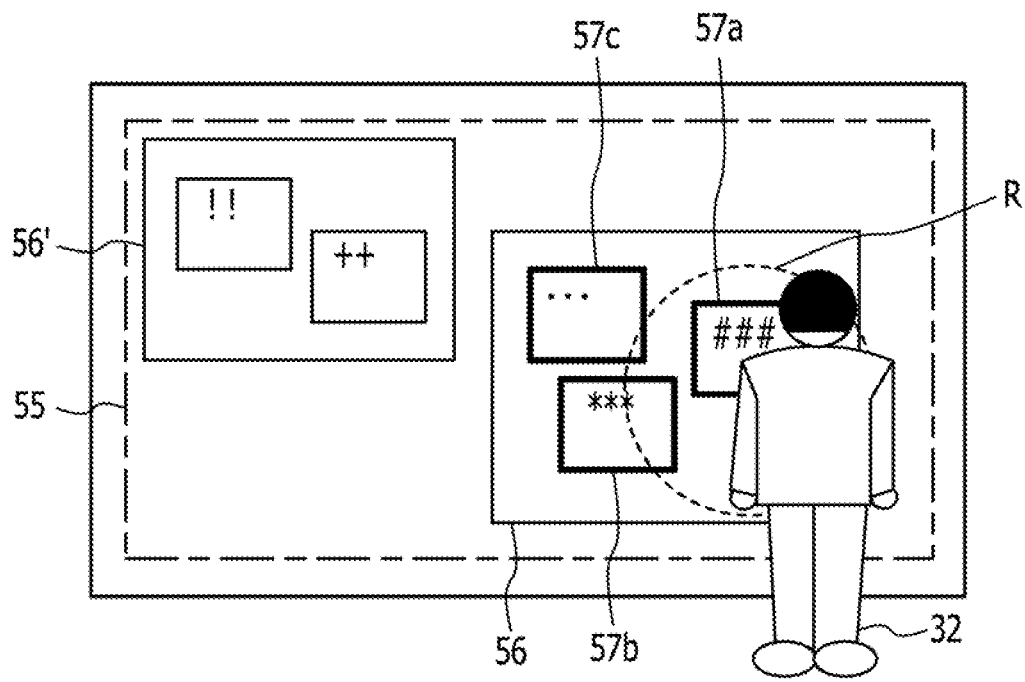
FIGS. 12A and 12B are display examples of a shadow image when a window is enlarged and a part of content is displayed.
Figure 12B:
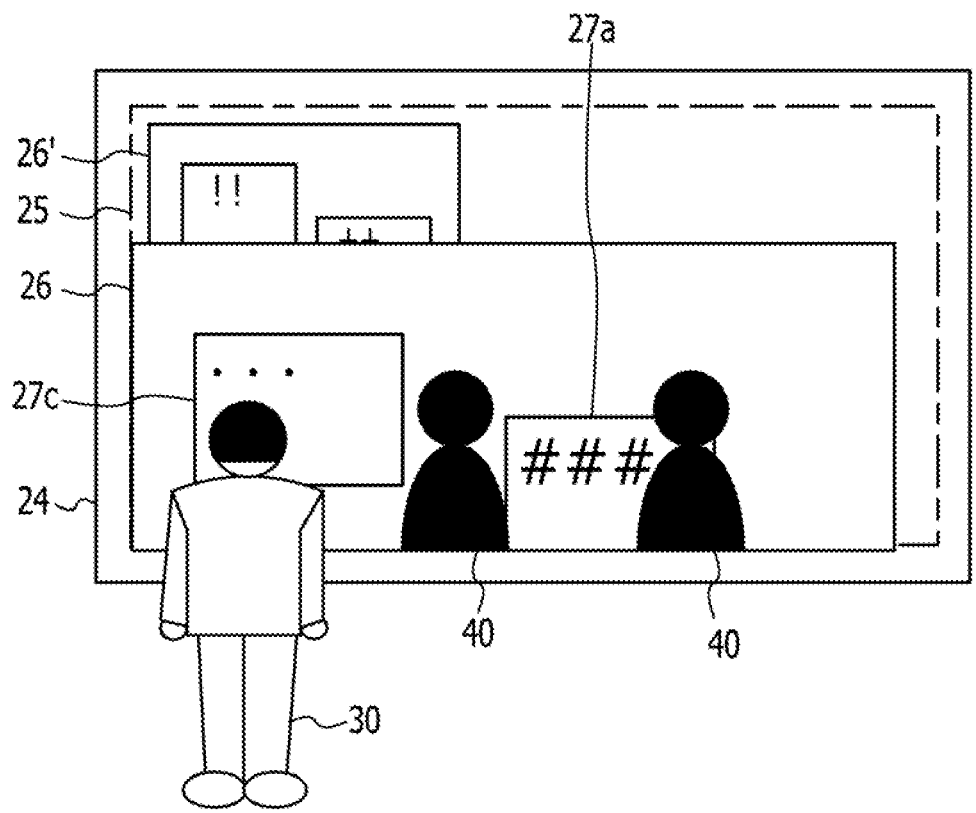

Next, as illustrated in FIG. 12A, when the contents 57a, 57b, 57c are included within the range R of the predetermined distance that the measurement-side user 32 can reach by hand, as illustrated in FIG. 12B, the image display unit 164 displays the shadow images 40 near the content 27a corresponding to the content 57a and near the content 27c corresponding to the content 57c. On the other hand, the content 27b corresponding to the content 57b is excluded from the display target of the display screen 25 due to enlargement of the window 26. In such a case, the image display unit 164 does not display the shadow image 40 corresponding to the content 27b. Thus, the problem that the respective shadow images 40 for the contents 27a, 27c do not appear on the display screen 55 is avoided when the window 26 is enlarged and the content 27b is excluded from the display screen 25.

Figure 13A:
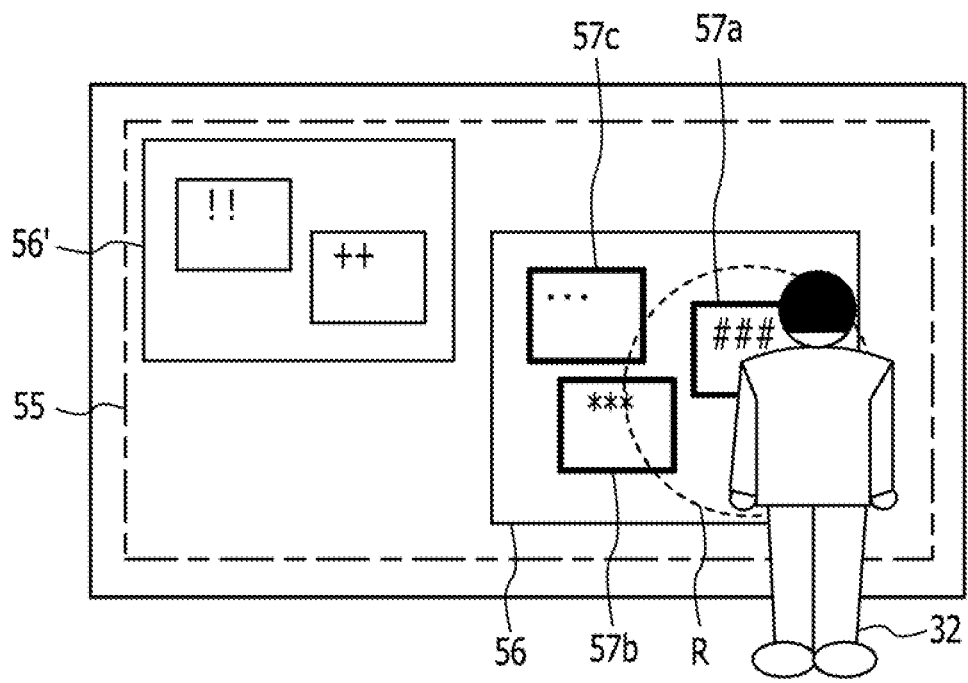
FIGS. 13A and 13B are display examples of a shadow image when a window is enlarged and a part of content is displayed.
Figure 13B:
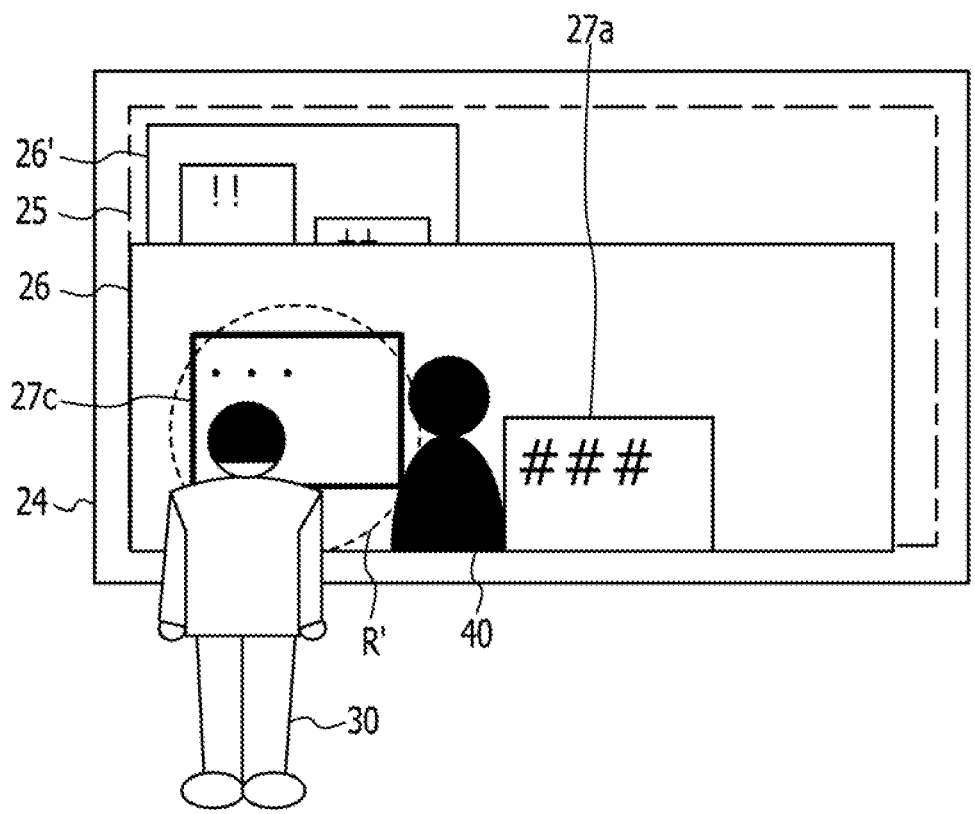

Next, as illustrated in FIG. 13A, when contents 57a, 57b, 57c are included within the range R of the predetermined distance that the measurement-side user 32 can reach by hand, as illustrated in FIG. 13B, the image display unit 164 may display the shadow image 40 near the content 27c, by limiting to the content 27c corresponding to the content 57c and present within the range R' of the predetermined distance that the display-side user 30 can reach by hand. In other words, in the display examples of FIG. 11B and FIG. 12B described above, the image display unit 164 displays the shadow image 40 also for the content 27a that the display-side user 30 cannot reach by hand, but as illustrated in FIG. 13B, the image display unit 164 does not need to display the shadow image 40 for the content 27a that the display-side user 30 cannot reach by hand. This is because the display-side user 30 has little intention to operate the content 27a since the display-side user 30 cannot reach the content 27a by hand.

Figure 14A:
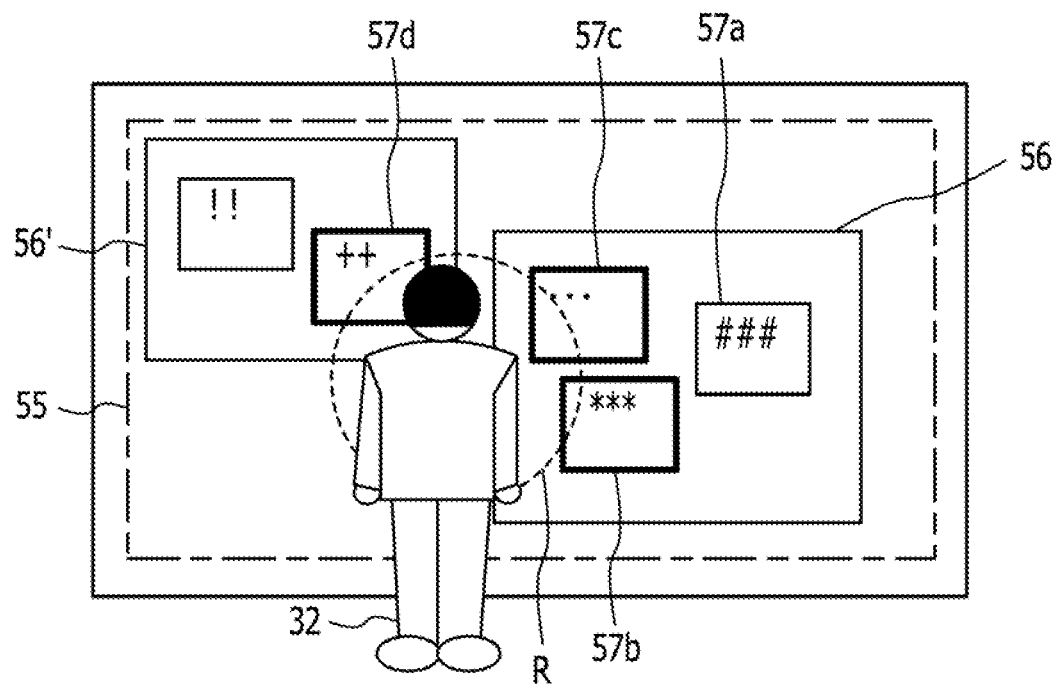
FIGS. 14A and 14B are display examples of a shadow image when a window is enlarged and a part of content is displayed.
Figure 14B:
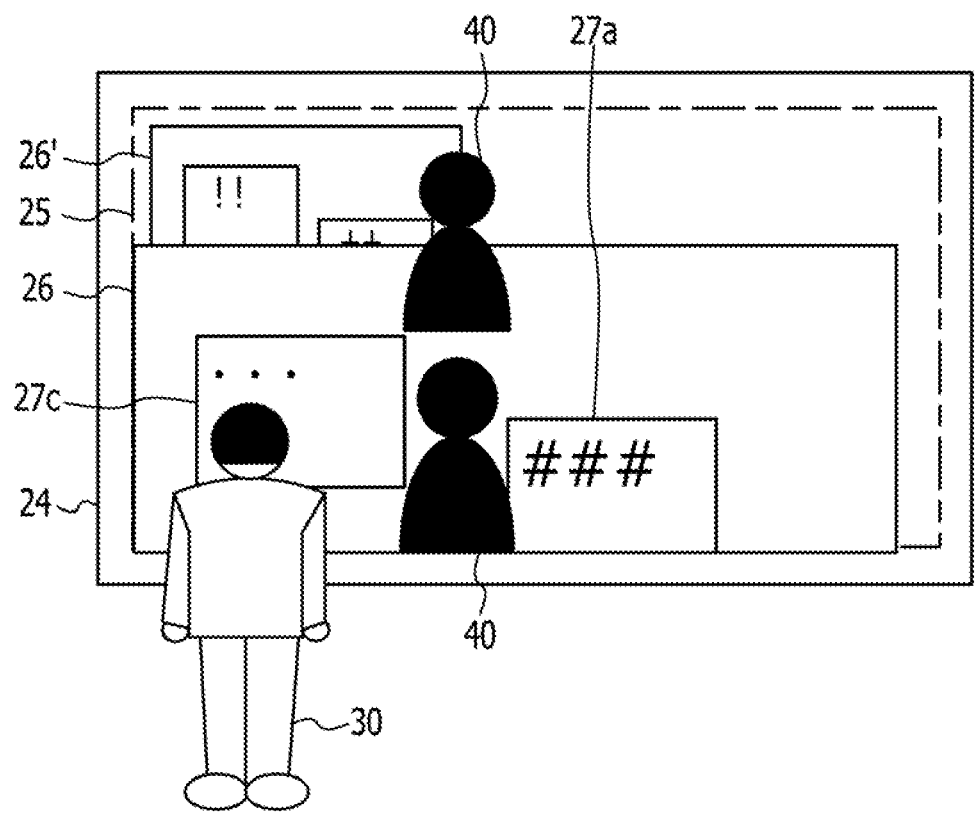

Next, as illustrated in FIG. 14A, when the contents 57b, 57c and the content 57d of the window 56' are included in the range R of the predetermined distance that the measurement-side user 32 can reach by hand, as illustrated in FIG. 14B, the image display unit 164 not only displays the shadow image 40 near the content 27c corresponding to the content 57c, but also displays the shadow image 40 near the content 27d corresponding to the content 57d. In other words, the image display unit 164 displays the shadow image 40 not only in units of contents but also in units of windows. Note that since the content 27b corresponding to the content 57b does not appear in the display screen 25 due to enlargement of the window 26, the image display unit 164 does not display the shadow image 40 for the content 27b.

Second Embodiment

Subsequently, a second embodiment of the present invention will be described with reference to FIGS. 15 to 19.

Figure 16A:
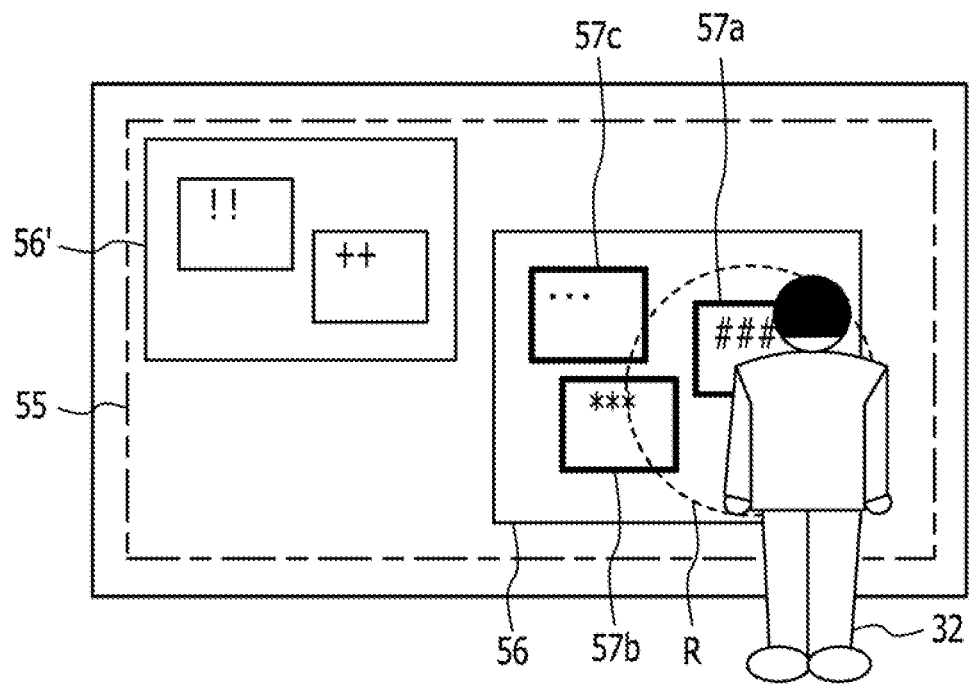
FIGS. 16A and 16B are views for explaining an example of aggregation of shadow images.
Figure 16B:
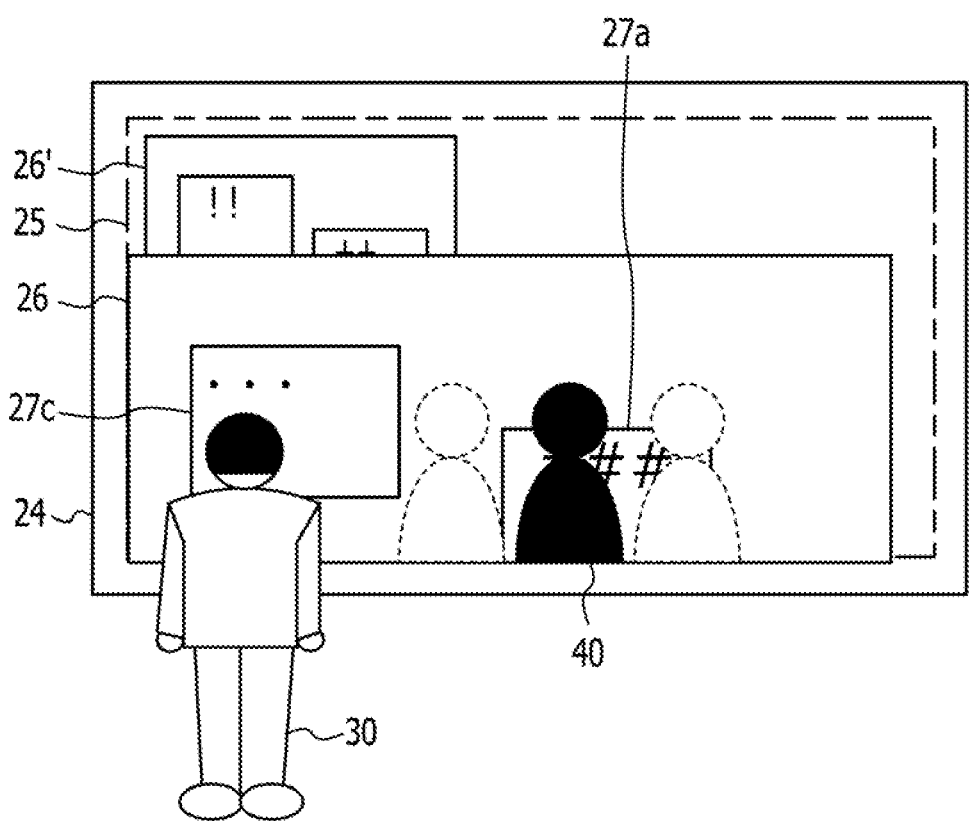
Figure 17A:
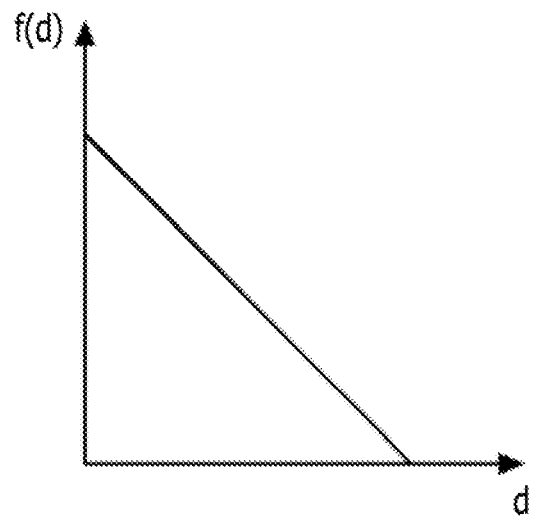
FIGS. 17A to 17C are examples of various weight functions used at a time of aggregation.
Figure 17B:
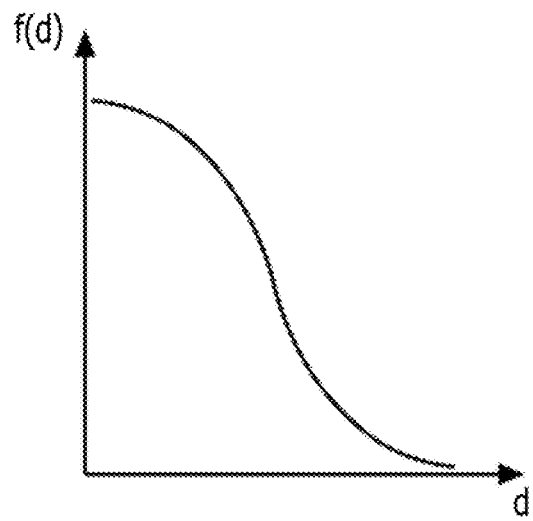
Figure 17C:
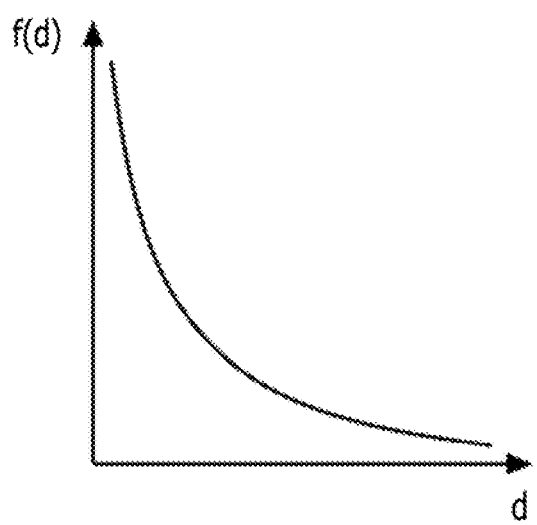

FIG. 15 is a flowchart illustrating an example of part of operation of the display-side control unit 162. FIGS. 16A and 16B are views for explaining an example of aggregation of shadow images 40. FIGS. 17A to 17C are examples of various weight functions used at a time of aggregation. FIGS. 18A and 18B and FIGS. 19A and 19B are other views for explaining an example of aggregation of the shadow images 40.

First, as illustrated in FIG. 15, when processing of step S209 described with reference to FIG. 8 is completed, the image display unit 164 determines whether a plurality of shadow images 40 are displayed or not (step S210). When a plurality of shadow images 40 are not displayed (NO in step S210), the image display unit 164 skips the subsequent process and ends the process. On the other hand, when a plurality of shadow images 40 are displayed (YES in step S210), the image display unit 164 aggregates shadow images (step S211).

For example, as described with reference to FIGS. 12A and 12B, when a plurality of shadow images 40 are displayed, the image display unit 164 aggregates a plurality of displayed shadow images 40 as illustrated in FIGS. 16A and 16B. Specifically, from screen coordinates (xi, yi) (i=integer of 1 to n) of the plurality of displayed shadow images 40, the image display unit 164 calculates their center of gravity, and displays one shadow image 40 at a position of the calculated center of gravity.

$$\left( \sum_{i=1}^{n} \frac{x_i}{n}, \sum_{i=1}^{n} \frac{y_i}{n} \right)$$

For example, instead of the center of gravity, the image display unit 164 may calculate a weighted average from the screen coordinates (xi, yi) (i=integer of 1 to n) of the displayed shadow images 40. For example, the weight of a shadow image 40 that is closer to the measurement-side user 32 or the display-side user 30 is increased. The weight function decreases in inverse proportion to a distance, from the measurement-side user 32 or the display-side user 30.

$$d_i (0 \leq d_i \leq 1) = \sqrt{x_i^2 + y_i^2}$$

For example, the image display unit 164 may calculate a weighted average using f(d)=a−bd (monotonically decreasing function) as illustrated in FIG. 17A. For example, the image display unit 164 may calculate the weighted average using f(d)=1−1/(1+exp(2d)) (sigmoid function) as illustrated in FIG. 17B. For example, the image display unit 164 may calculate the weighted average using f(d)=1/d (inverse proportional function) as illustrated in FIG. 17C. At this time, the image display unit 164 displays one shadow image 40 at a position of ($\Sigma f(d_i) x_i / n$, $\Sigma f(d_i) y_i / n$).

Figure 18A:
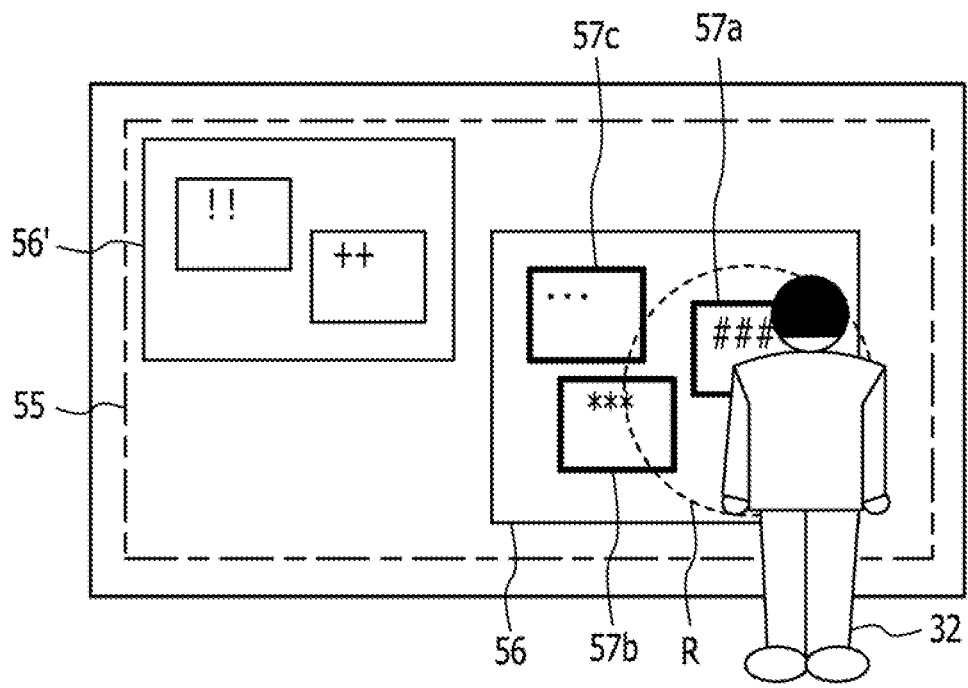
FIGS. 18A and 18B are other views for explaining an example of aggregation of shadow images.
Figure 18B:
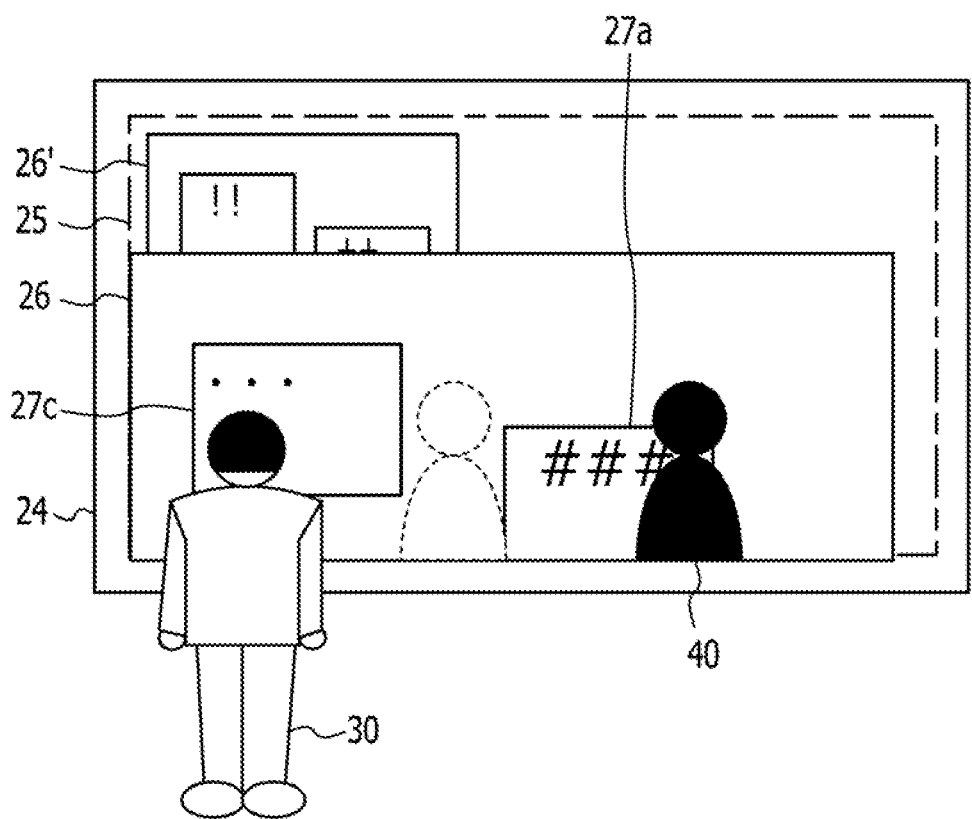
Figure 19A:
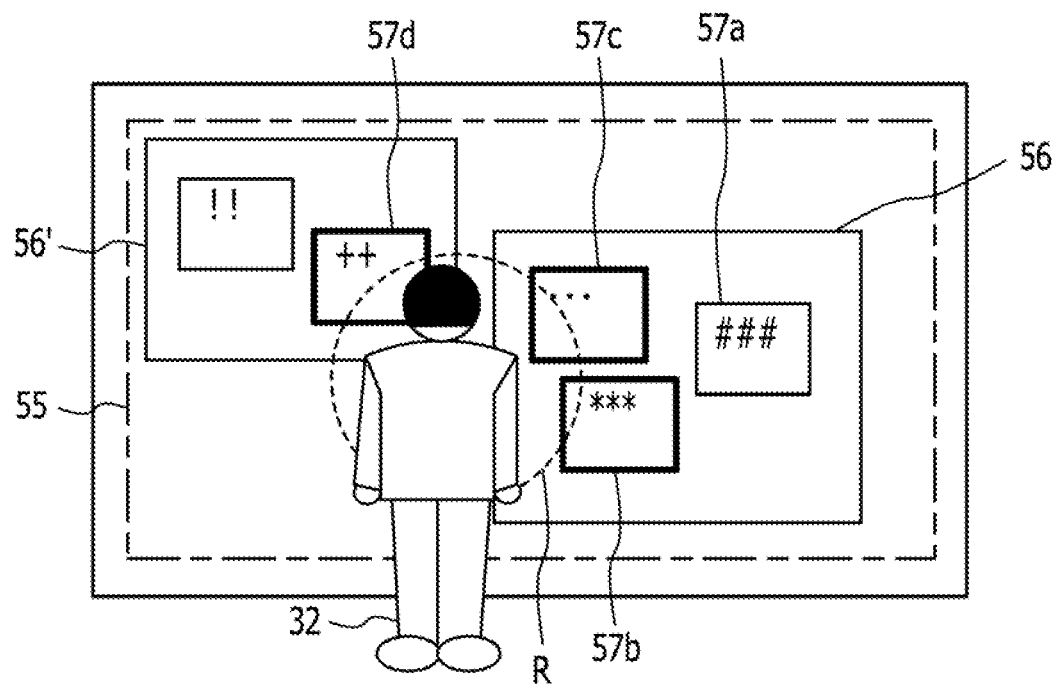
FIGS. 19A and 19B are other views for explaining an example of aggregation of shadow images.
Figure 19B:
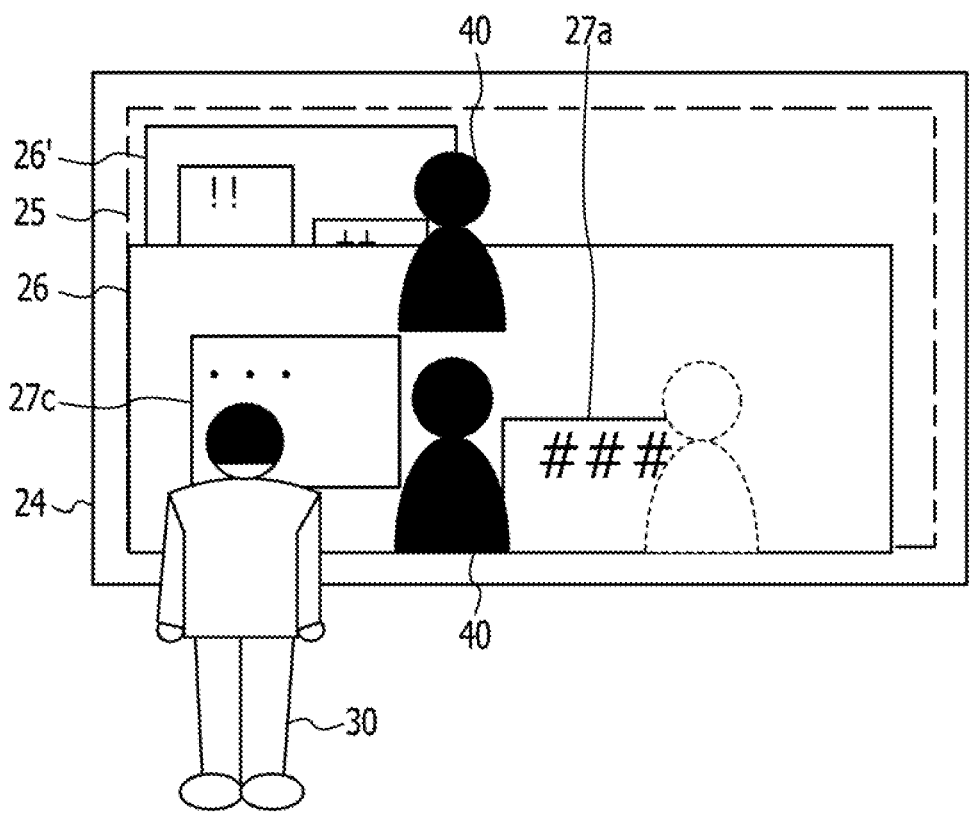

Further, when a plurality of shadow images 40 are displayed, as illustrated in FIGS. 18A and 18B, the image display unit 164 may aggregate shadow images 40 at the content 27a corresponding to the content 57a that is closest to the measurement-side user 32 among the plurality of displayed shadow images 40. Moreover, when a plurality of shadow images 40 are displayed, the image display unit 164 may aggregate the shadow images 40 in units of windows as illustrated in FIGS. 19A and 19B. For example, when the contents 57b, 57c of the window 56 and the contents 57d of the window 56' are included in the range R of a predetermined distance that the measurement-side user 32 can reach by hand, a plurality of shadow images 40 displayed on the window 26 may be aggregated into one, and one shadow image 40 displayed in the window 26' does not need to be aggregated.

As described above, according to the present embodiment, the server apparatus 13, which allows sharing of the contents 27a, 27b, 27c, 57a, 57b, 57c to be displayed on the respective display screens 25, 55 of the first content display apparatus 11 and the second content display apparatus 12, includes the measurement-side control unit 131 and the display-side control unit 132. When the first content display apparatus 11 displays parts 27a, 27c of the contents 27a, 27b, 27c, the measurement-side control unit 131 and the display-side control unit 132 determine whether or not the measurement-side user 32 who operates the second content display apparatus 12 is at a position where it is possible to operate the part 27c of the contents among the contents 27a, 27b, 27c displayed on the first content display apparatus 11, and cause the first content display apparatus 11 to display a shadow image 40 indicating that the measurement-side user 32 is present at the position where it is possible to operate the part 27c of the contents based on a determination result. In this manner, when the contents 27a, 27b, 27c, 57a, 57b, 57c are shared by the first content display apparatus 11 and the second content display apparatus 12, presence of the measurement-side user 32 at a position where it is possible to operate the content 27c can be determined.

Although the preferred embodiments of the present invention have been described in detail, the present invention is not limited to the specific embodiments according to the present invention, and various modifications and changes may be made within the scope of the gist of the present invention described in the claims. For example, in the above-described embodiment, the projector is used as the display device for description. However, a liquid crystal display may be used as the display device instead of the projector. Further, although enlargement has been described as an example, reduction is similar to the case of enlargement.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
   select, when a first apparatus, which a first user, displays a part of one or more first contents on a first screen of the first apparatus, one or more second contents which are at a position within a second range of a second predetermined distance from a second user, who operates a second apparatus which is different from the first apparatus, and indicating a position where it is possible to operate on a second screen of the second apparatus by the second user from among the one or more first part of the contents;
   select, form among the selected one or more second contents, one or more third contents, which are at a position within a first range of a first predetermined distance from the first user and indicating a position where it is possible to operate on the first screen of the first apparatus by the first user;
   cause the first apparatus to display, on the first screen, the selected one or more third contents and an image indicating that the second user is present at the position within the second range of the second predetermined distance from the second user and the first user is present at the position within the first range of the first predetermined distance from the first user in the vicinity of the selected one or more second contents; and
   when causing a plurality of the images to be displayed, determine a display position where the plurality of the images are aggregated based on a center of gravity or a weighted average of the plurality of the images, or determine a position set in advance as the display position where the plurality of the images are aggregated.

2. The information processing apparatus according to claim 1, wherein the processor is configured to:
   calculate a position of the second user with coordinates in a screen coordinate system of a second screen of the second apparatus; and
   cause the first apparatus to display the image by using the calculated position.

3. The information processing apparatus according to claim 2, wherein the processor is configured to:
   calculate a position of the second user with coordinates in a window coordinate system of a window including the one or more second contents; and
   cause the first apparatus to display the image near the one or more second contents using the calculated position.

4. An information processing method comprising:
   selecting, by a computer, when a first apparatus, which a first user operates, displays a part of one or more first contents on a first screen of the first apparatus, one or more second contents which are at a position within a second range of a second predetermined distance from a second user, who operates a second apparatus which is different from the first apparatus, and indicating a position where it is possible to operate on a second screen of the second apparatus by the second user rom among the part of the one or more first contents;
   selecting, form among the selected one or more second contents, one or more third contents, which are at a position within a first range of a first predetermined distance from the first user and indicating a position where it is possible to operate on the first screen of the first apparatus by the first user;
   causing the first apparatus to display, on the first screen, the selected one or more third contents and an image indicating that the second user is present at the position within the second range of the second predetermined distance from the second user and the first user is present at the position within the first range of the first predetermined distance from the first user in the vicinity of the selected one or more second contents; and
   when causing a plurality of the images to be displayed, determining a display position where the plurality of the images are aggregated based on a center of gravity or a weighted average of the plurality of the images, or determining a position set in advance as the display position where the plurality of the images are aggregated.

5. The information processing method according to claim 4, further comprising:
calculating a position of the second user with coordinates in a screen coordinate system of a second screen of the second apparatus; and
causing the first apparatus to display the image using the calculated position.

6. The information processing method according to claim 5, further comprising:
calculating a position of the second user with coordinates in a window coordinate system of a window including the one or more second contents; and
causing the first apparatus to display the image near the one or more second contents by using the calculated position.

7. A non-transitory computer-readable recording medium recording an information processing program which causes a computer to execute a process of:
selecting, when a first apparatus, which a first user operates, displays a part of one or more first contents on a first screen of the first apparatus, one or more second contents which are at a position within a second range of a second predetermined distance from a second user, who operates a second apparatus which is different from the first apparatus, and indicating a position where it is possible to operate on a second screen of the second apparatus by the second user from among the part of the one or more first contents;
selecting, form among the selected one or more second contents, one or more third contents, which are at a position within a first range of a first predetermined distance from the first user and indicating a position where it is possible to operate on the first screen of the first apparatus by the first user;
causing the first apparatus to display, on the first screen, the selected one or more third contents and an image indicating that the second user is present at the position within the second range of the second predetermined distance from the second user and the first user is present at the position within the first range of the first predetermined distance from the first user in the vicinity of the selected one or more second contents; and
when causing a plurality of the images to be displayed, determining a display position where the plurality of the images are aggregated based on a center of gravity or a weighted average of the plurality of the images, or determining a position set in advance as the display position where the plurality of the images are aggregated.

8. The non-transitory computer-readable recording medium according to claim 7, further comprising:
calculating a position of the second user with coordinates in a screen coordinate system of a second screen of the second apparatus; and
causing the first apparatus to display the image using the calculated position.

9. The non-transitory computer-readable recording medium according to claim 8, further comprising:
calculating a position of the second user with coordinates in a window coordinate system of a window including the one or more second contents; and
causing the first apparatus to display the image near the one or more second contents by using the calculated position.

* * * * *